US011126682B1

(12) United States Patent
Silverstein et al.

(10) Patent No.: US 11,126,682 B1
(45) Date of Patent: Sep. 21, 2021

(54) HYPERLINK BASED MULTIMEDIA PROCESSING

(71) Applicant: INTERNATIONAL BUSINESS MACHINES CORPORATION, Armonk, NY (US)

(72) Inventors: Zachary A. Silverstein, Jacksonville, FL (US); Tiberiu Suto, Franklin, NY (US); Nadiya Kochura, Bolton, MA (US); Hemant Kumar Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/921,138

(22) Filed: Jul. 6, 2020

(51) Int. Cl.
| G06F 17/00 | (2019.01) |
| G06F 16/955 | (2019.01) |
| G06F 40/20 | (2020.01) |
| G06F 16/48 | (2019.01) |
| G06F 16/438 | (2019.01) |

(52) U.S. Cl.
CPC ...... *G06F 16/9558* (2019.01); *G06F 16/4393* (2019.01); *G06F 16/489* (2019.01); *G06F 40/20* (2020.01)

(58) Field of Classification Search
CPC ............. G06F 16/9558; G06F 16/4393; G06F 16/489; G06F 40/20
See application file for complete search history.

(56) References Cited

U.S. PATENT DOCUMENTS

| 8,060,407 B1 | 11/2011 | Delker et al. |
| 8,707,182 B2 | 4/2014 | Bassali et al. |
| 9,769,544 B1 | 9/2017 | Pau |
| 10,001,904 B1 * | 6/2018 | Geller ............ G11B 27/34 |
| 10,373,196 B2 | 8/2019 | Ma et al. |

(Continued)

FOREIGN PATENT DOCUMENTS

| CA | 2 874 013 C | 7/2017 |
| WO | WO 2012/131430 A1 | 10/2012 |

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

*Primary Examiner* — Laurie A Ries
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The method computer program products, and systems can include, for instance: identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

20 Claims, 10 Drawing Sheets

(56) References Cited

U.S. PATENT DOCUMENTS

| | | |
|---|---|---|
| 10,896,620 B2 * | 1/2021 | Nevarez ................. G09B 5/065 |
| 2002/0144262 A1 | 10/2002 | Plotnick et al. |
| 2003/0061201 A1 * | 3/2003 | Grefenstette ........... G06F 16/93 |
| 2010/0318520 A1 * | 12/2010 | Loeb ................... G06F 16/4393 |
| | | 707/743 |
| 2011/0173214 A1 * | 7/2011 | Karim ................... G06F 16/148 |
| | | 707/754 |
| 2013/0006866 A1 | 1/2013 | Pendakur et al. |
| 2013/0145248 A1 | 6/2013 | Friedlander et al. |
| 2014/0044407 A1 * | 2/2014 | Kuznetsov ....... H04N 21/47202 |
| | | 386/241 |
| 2014/0337126 A1 | 11/2014 | Ohanyan et al. |
| 2017/0070783 A1 * | 3/2017 | Printz .................... G11B 27/34 |
| 2017/0084308 A1 * | 3/2017 | Gilley ................... H04N 7/173 |
| 2017/0171125 A1 * | 6/2017 | Chow ................. G06F 16/957 |
| 2018/0197575 A1 * | 7/2018 | Doherty ............... G06F 3/0485 |
| 2018/0352014 A1 * | 12/2018 | Alsina ................ H04N 21/4524 |
| 2019/0163703 A1 | 5/2019 | Goikhman et al. |
| 2021/0006544 A1 * | 1/2021 | Lewin |

\* cited by examiner

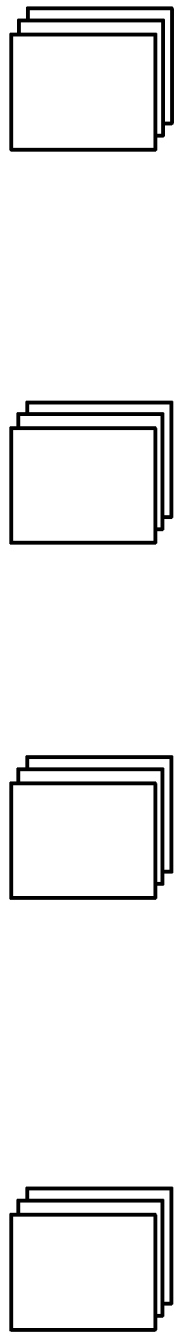

FIG. 6

COMMENT ENTRY "E" 12:18

EXTRACTED TOPICS:
MUSIC
CELLO
INSTRUMENT

TIMING STATISTICS:
CELLO AT 12:24

SETTING:
INDOOR MODERN

COMMENT ENTRY "K" 4:06

EXTRACTED TOPICS:
CARPET
CARPET CLEANER
CLEANING
STAIN

TIMING STATISTICS:
CARPET AT 4:06
STAIN AT 4:17

SETTING:
INDOOR MODERN

COMMENT ENTRY "S" 1:01

EXTRACTED TOPICS:
ANTIQUES
CLOCK

TIMING STATISTICS:
CLOCK AT 1:12

SETTING:
INDOOR MODERN

COMMENT ENTRY "F" 3:23

EXTRACTED TOPICS:
HEATING
BUILDING
DUCT

TIMING STATISTICS:
DUCT AT 3:23

SETTING:
INDOOR MODERN

HYPERLINK BASED MULTIMEDIA PROCESSING

BACKGROUND

The present disclosure relates generally to data sharing systems and particularly to a video sharing system.

Data structures have been employed for improving operation of computer system. A data structure refers to an organization of data in a computer environment for improved computer system operation. Data structure types include containers, lists, stacks, queues, tables, and graphs. Data structures have been employed for improved computer system operation, e.g., in terms of algorithm efficiency, memory usage efficiency, maintainability, and reliability.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

In another aspect, a computer program product can be provided. The computer program product can include a computer readable storage medium readable by one or more processing circuit and storing instructions for execution by one or more processor for performing a method. The method can include, for example: identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

In a further aspect, a system can be provided. The system can include, for example a memory. In addition, the system can include one or more processor in communication with the memory. Further, the system can include program instructions executable by the one or more processor via the memory to perform a method. The method can include, for example: identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 is a schematic diagram illustrating performance of a process performed by a manager system according to one embodiment;

DETAILED DESCRIPTION

Figure 1:
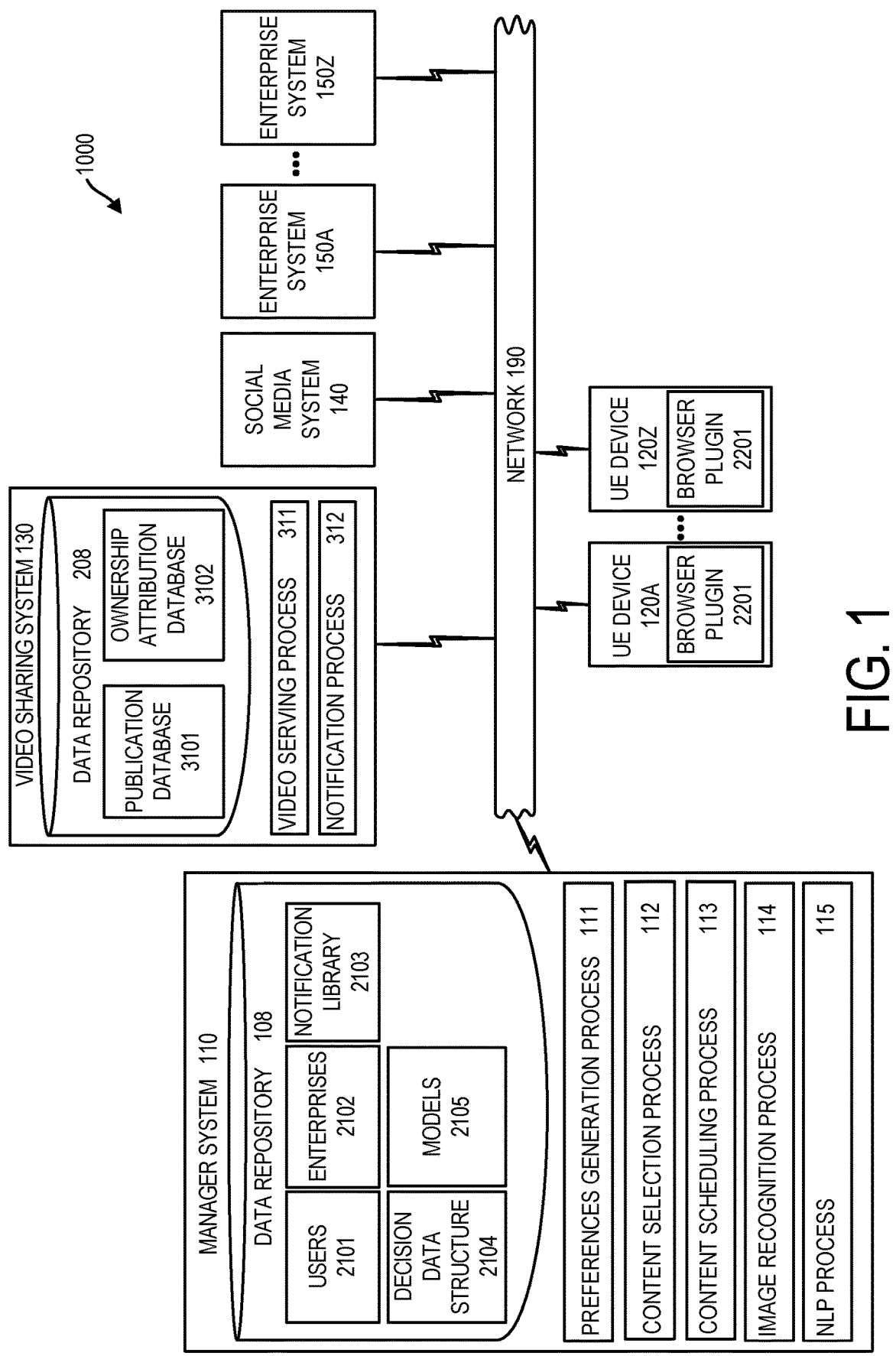
FIG. 1 is a system having a manager system, a video sharing system, UE devices, and other components according to one embodiment.

System 1000 for use in accelerating a user interface is shown in FIG. 1. System 1000 can include manager system 110 having an associated data repository 108, user equipment (UE) devices 120A-120Z, video sharing system 130, social media system 140, and enterprise systems 150A-150Z. Manager system 110, UE devices 120A-120Z, video sharing system 130, social media system 140, and enterprise systems 150A-150Z can be in communication with one another via network 190. System 1000 can include numerous devices which can be computing node based devices connected by network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, manager system 110 can be external to UE devices 120A-120Z, video sharing system 130, social media system 140, and enterprise systems 150A-150Z. In one embodiment, manager system 110 can be co-located with one or more of UE devices 120A-120Z, video sharing system 130, social media system 140, and enterprise systems 150A-150Z.

Each of the respective UE devices 120A-120Z can be associated to a different user. Regarding UE devices 120A-120Z, a UE device of UE devices 120A-120Z, in one embodiment, can be a computing node device provided by a client computer, e.g., a mobile device, e.g., a smartphone or tablet, a laptop, smartwatch, or personal computer that runs one or more program, e.g., including a web browser for opening and viewing web pages. Respective ones of UE devices 120A-120Z can include browser plugin 2201. Browser plugin 2201 can facilitate the reporting of UE devices 120A-120Z of browsing data, which browsing data can include e.g., webpage data rendered on UE device of UE devices 120A-120Z resulting from a page load by video sharing system 130 in response to user defined webpage request data sent by the UE device.

Video sharing system 130 can be accessed publicly by a user who is using a UE device of UE devices 120A-120Z. Video sharing system 130 can have, for example, a domain name that is accessible to the user system through the world-wide web. Video sharing system 130 can have an IP address located in a particular country, or globally, depending on the policies of the video sharing system.

A UE device of UE devices 120A-120Z can, for example, search a video sharing system 130 based on one or more user input, go to a particular location on the video sharing system 130, or make a request to the video sharing system 130. Upon accessing the video sharing system 130, a UE device of UE devices 120A-120Z can then make requests to the video sharing system 130 for a video file or a section of the video file.

Video sharing system 130 can stream packet video data of the video file published on publication database 3101 of the video sharing system 130. When a UE device of UE devices 120A-120Z requests to watch the video file, video sharing system 130 can break up the video file into smaller pieces, known as, for example, packets, and send these packets to a target address. A UE device can then access the packets in a variety of ways. A UE device can process packets as they arrive. A UE device, for example, can wait for a particular size of packets to arrive before they process, or wait for a certain packet to arrive. Packets when accessed by a UE device can then display sections of the video file on a display of the UE device. The video file can be viewed on, for example, a website of the video sharing system 130 using a browser of a UE device or downloaded on a UE device.

In one embodiment, the video sharing system 130 can be provided by a large scale video sharing system and can have characteristics common to publicly available large video sharing systems such as USTREAM®, YOUTUBE®, or FACEBOOK®. USTREAM® is a registered trademark of International Business Machines Corporation, YOUTUBE® is a registered trademark of YouTube, LLC, and FACEBOOK® is a registered trademark of Facebook, Inc.

Video sharing system 130 can provide users the possibility to access videos uploaded by other users. Video sharing system 130 can be large scale video distribution video sharing systems that can input and distribute videos in different qualities (SD, 720p, 1080p, 4k) and formats (mp4, fly, avi, mov, mkv). Video sharing system 130 can be operative to support copyright protections and law regulations in multiple countries. Video sharing system 130 can be operative to perform transcoding in real time or near real time, specific to video formats. Video sharing system 130 can be operative to support from tens of thousands to billions of video views per day, using distributed architectures and high scalability. Embodiments herein recognize that due to large scale support requirements of video sharing system 130, video sharing system 130 can benefit from attribution methods, products, and systems that use reduced resources in terms of hardware, bandwidth and power consumption.

In one embodiment, video sharing system 130 can be an online scalable video sharing system that supports authorship information exchange between video sharing system 130 and other video sharing systems. In one embodiment, video sharing system 130 and a second video sharing system can be external to one another, e.g., can be one or more of logically separated, physically separated, or operated by different organizational entities. Data management by video sharing system 130 of a plurality of video files can be done through a variety of data management methods, such as, for example, SQL or NoSQL databases. Management of the video files can also further be managed by video sharing system 130 not by records in a query language format, but by creating a database of pointers to addresses where the video data is contained to index and manage the video files. The video files can be stored on hard disk or other long term storage device and accessed when needed. This database of pointers allows for efficiency in handling large amounts of video data. Databases can further describe video files, such as video ID number, genre, author, and submission date. Databases can also be sharded. Sharding may be performed to partition massive databases into manageable subparts with video sharing system 130 having policies to pull data from the relevant shards on a data request. The shards may be determined based on qualities such as time submitted or genre in a way that make them manageable to video sharing system 130 so that upon a request for data, video sharing system 130 can retrieve the relevant video data, e.g., authorship attribution video file records.

Content can be exchanged between video sharing systems through an authorization process. Standard coding procedures in, for example, object-oriented languages, typically designate data, also known as state, as private for purposes of data access, meaning that the data cannot be directly accessed by external mechanisms, such as, for example, classes in object-oriented languages. Development during the program code that will access this data typically requires function calls, also known as behavior of the data, that can allow a video sharing system to access the data without passing the private data member to the video sharing system. This is also known to those of ordinary skill in the art as encapsulation of the private data. Thus, content can be exchanged between video sharing systems with private data being maintained as private data. A communication channel can be operational so that, for example, video sharing system 130 may send messages to a second video sharing system. Upon receiving a message to access data from video sharing system 130, the second video sharing system may determine if video sharing system 130 is authorized.

Social media system 140 can include a collection of files, including, for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider or an email delivery system. Manager system 110 can include a messaging system in one embodiment. During a process of registration wherein a user of system 1000 registers as a registered user of system 1000, a user sending registration data can send, with permission data defining the registration data, a permission that grants access by manager system 110 to data of the user within social media system 140. On being registered, manager system 110 can examine data of social media system 140, e.g., to determine whether first and second users are in communication with one another via a messaging system of social media system 140. A user can enter registration data using a user interface displayed on a UE device of UE devices 120A-120Z. Entered registration data can include, e.g., name, address, social media account information, other contact information, biographical information, background information, preferences information, and/or permissions data, e.g., can include permissions data allowing manager system 110 to query data of a social media account of a user provided by social media system 140 including messaging system data and any other data of the user. When a user opts-in to register into system 1000 and grants system 1000 permission to access data of social media system 140, system 1000 can inform the user as to what data is collected and why, that any collected personal data may be encrypted, that the user can opt out at any time, and that if the user opts out, any personal data of the user is deleted.

System 1000 can be configured to accelerate user interface operations so that preferences of a user are readily discerned and responded to. System 1000 provides improvements in computer technology, including in the realm of accelerated user interfaces and in the realm of video sharing systems. System 1000 can, for example, process metadata associated to a video file for playback, and based on the processing, can identify video segments thereof for preprocessing prior to a subsequent user interface action by a user. Video file content can thereby be pre-processed prior to user interface action in anticipation of user interface action. An accelerated user interface herein can provide to user accelerated access to information and or items, such as product items and/or service items.

Data repository 108 in users area 2101 can store data on individual users of system 1000. On registration of a user into system 1000, manager system 110 can assign each new user a universally unique identifier (UUID). For each user, data repository 108 in users area 2101 can store various data such as contacts data, e.g., address information, social media account information and the like, permissions of a user including permissions to access data from social media accounts and devices of the user and the like, and also can include preferences data. According to one embodiment, data repository 108 in users area 2101 can store an iteratively updated preferences data that specifies preferences of a user. Preferences of a user can include positive preferences, i.e., items that the user likes, and negative preferences, i.e., items such as topics that the user does not like. Users area 2101 can also store historical data of a user from one or more data source. Data sources can include, e.g., devices of a user and/or social media system 140.

Data repository 108 in enterprise area 2102 can store data on enterprises that provide items such as product items and service items to users of system 1000. In some embodiments, enterprises can generate content that define notifications to users. Notifications can include video notification files which can guide a user in the acquisition of an item. The notifications can be notifications regarding items for acquisition by users.

Enterprise systems 150A-150Z can be associated to respective enterprises that provide content in the form of video notification files. Data repository 108 in notification library 2103 can include content obtained from respective ones of enterprise systems 150A-150Z. Such content stored in notification library 2103 can include a plurality of candidate video notification files for playback. The video notification files can guide a user in the acquisition of items such as physical items and/or service items. Data repository 108 in decision data structures area 2104 can include one or more decision data structures for return of an action decision. Decision data structures can include, e.g., decision tables and/or decision trees. Data repository 108 in models area 2105 can store one or more predictive model for return of action decisions. The one or more predictive model can be trained with use of training data provided by historical data stored within users area 2101.

Manager system 110 can run various processes. Manager system 110 running preferences generation process 111 can determine preferences of a user such as positive and negative preferences of a user on an iterative basis so that user preferences are iteratively updated throughout a deployment period. Manager system 110 running preferences generation process can include manager system 110 applying a multi-factor formula for determination of a user's preferences.

Manager system 110 running preferences generation process 111 can include manager system 110 iteratively generating an ordered list of highest ranked positive preferences of a user. Manager system 110 running preferences generation process 111 can include manager system 110 iteratively generating an ordered list of preferences of a user with scoring values associated to each respective preference item. The ordered list of preferences can include a comprehensive list of topics historically recognized by the system, with a scoring value associated to each topic, the scoring value being on a scale of 0.0 to 1.0 and specifying the user's preference (negative to positive) with respect to the topic.

Manager system 110 running content selection process 112 can include manager system 110 selecting content for presentment to a user. Manager system 110 running content selection process 112 can include manager system 110 processing text based comment data associated to a selected video file for playback for determination of content for augmentation of the selected video file for playback. Manager system 110 running content selection process 112 can include manager system 110 selecting a video notification file from a plurality of candidate video files stored in notification library 2103 of data repository 108. Manager system 110 running content selection process 112 can include manager system 110 selecting a notification to match a determined environmental setting of a video segment.

Manager system 110 running content scheduling process 113 can include manager system 110 scheduling content for presentment to a user. According to one embodiment, manager system 110 running content scheduling process 113 can ascertain the timing for presentment of content to a user in dependence on processing of content text associated to a selected video file for playback.

Manager system 110 running image recognition process 114 to examine spatial image data representing a feature of interest can include manager system 110 employing object recognition processing using one or more of, e.g., feature extraction algorithms, classification algorithms, and/or clustering algorithms. In one embodiment, manager system 110 running image recognition process 114 can include performing of digital image processing. Digital image processing can include, e.g., filtering, edge detection, shape classification, optical character recognition (OCR), and/or encoded information decoding. For performing object recognition, manager system 110 can apply a machine learning process for object detection. Manager system 110 can, for example, identify features within and then use a technique, e.g., support vector machine (SVM) to perform classification. Manager system 110, for identifying a feature, can, e.g., use one or more of a Viola-Jones object detection framework, a scale-invariant feature transform (SIFT), or a histogram of oriented gradients (HOG) technique.

Manager system 110 can run natural language processing (NLP) process 115 to process data for preparation of records that are stored in data repository 108 or used in a live decision stream. Manager system 110 can run NLP process 115 for determining one or more NLP output parameter of a message. NLP process 115 can include one or more of a topic classification process that determines topics of messages and output one or more topic NLP output parameter, a sentiment analysis process which determines sentiment parameter for a message, e.g., polar sentiment NLP output parameters, "negative," "positive," and/or non-polar NLP output sentiment parameters, e.g., "anger," "disgust," "fear," "joy," and/or "sadness," or other classification process for output of one or more other NLP output parameters, e.g., one of more "social tendency" NLP output parameter or one or more "writing style" NLP output parameter.

By running of NLP process 115, manager system 110 can perform a number of processes including one or more of (a) topic classification and output of one or more topic NLP output parameter for a received message, (b) sentiment classification and output of one or more sentiment NLP output parameter for a received message, or (c) other NLP classifications and output of one or more other NLP output parameter for the received message.

Topic analysis for topic classification and output of NLP output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 115 can include manager system 110 returning NLP output parameters in addition to topic and sentiment, e.g., can provide sentence segmentation tags and part of speech tags. Manager system 110 can use sentence segmentation parameters to determine, e.g., that an action topic and an entity topic are referenced in a common sentence.

Video sharing system 130 can include data repository 208 storing various data. In data repository 208, there can be included a publication database 3101 and an ownership attribution database 3102. Publication database 3101 can store video files so that the video files are accessible by users who are associated to UE devices 120A-120E. Ownership attribution database 3102 can store data on the owner of respective video files of publication database, and associated data, e.g., specifying, author, creation date, and publication date of respective video files.

Video sharing system 130 running video serving process 311 can include video sharing system 130 serving video file data to a requesting client. When a UE device of UE devices 120A-120Z requests to watch a video file, video sharing system 130 running video serving process 311 can break up the video file into smaller pieces, known as, for example, packets, and send these packets to a target address. A UE device can then access the packets for playback with use of a video player installed on the UE device.

Video sharing system 130 running notification process 312 can include video sharing system 130 augmenting a video file during playback with video data notification content, in which content can be scheduled with use of content scheduling process 113 and selected with use of content selection process 112. Video sharing system 130 running notification process 312 can include video sharing system 130 augmenting video file playback data with augmented content which can provide a user with information on item acquisition, e.g., product item acquisition or service item acquisition. Video sharing system 130 running notification process 312 can provide a notification determined by system 1000 to be pertinent to the user. Video sharing system 130 running notification process 312 can inject a video notification file for playback to a user with a selected video file selected by a user.

Figure 2:
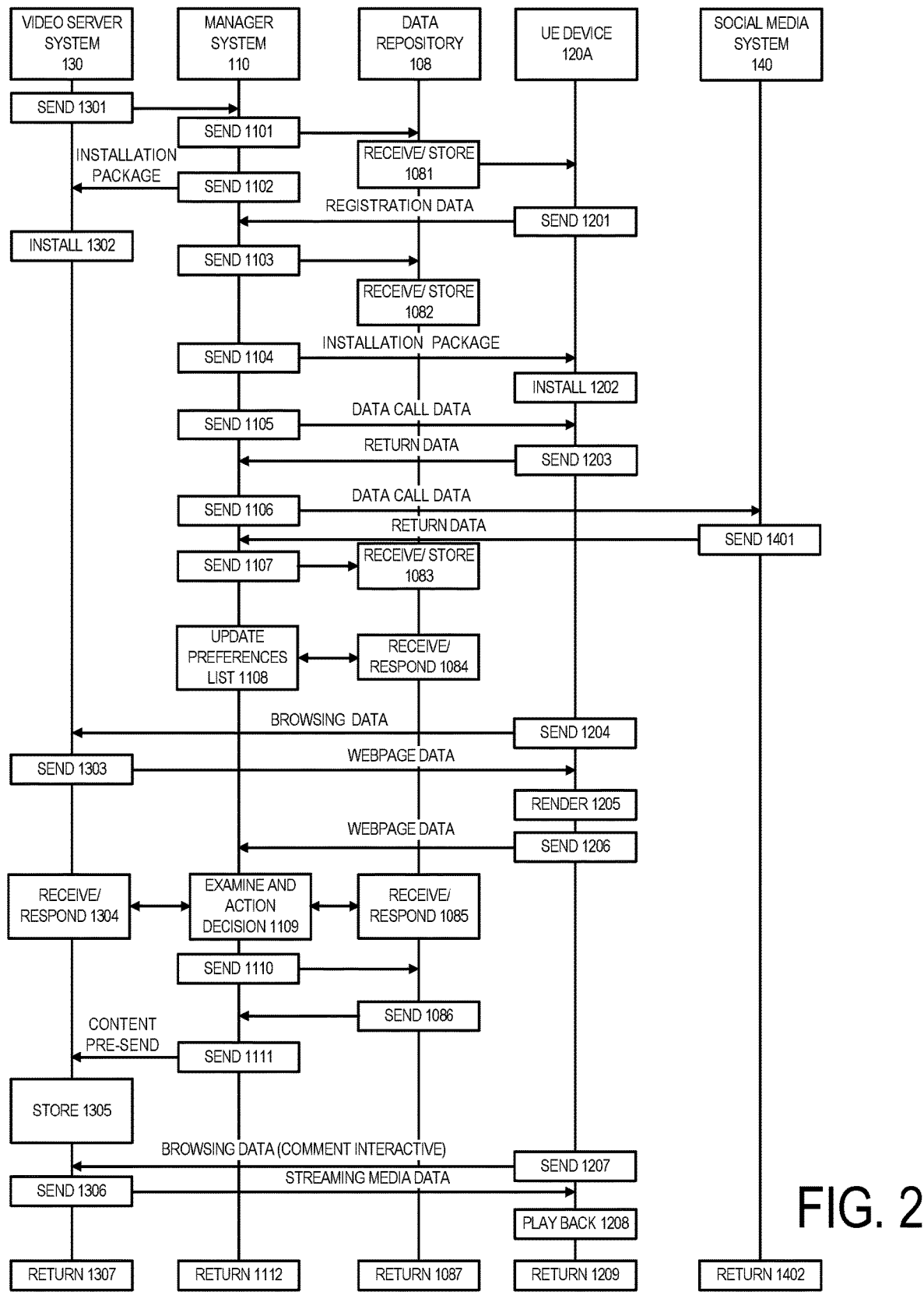
FIG. 2 is a flowchart depicting a method for performance by a manager system interoperating with other components according to one embodiment.

A method for performance by manager system 110 interoperating with video sharing system 130, a UE device 120A, and social media system 140, is set forth herein with reference to the flowchart of FIG. 2.

At block 1301, video sharing system 130 can be sending registration data for receipt by manager system 110. In response to the receipt of the registration data, manager system 110 at block 1101 can send the registration data for receipt and storage by data repository 108 at block 1081. In response to receipt of the registration data, manager system 110 at block 1102 can send an installation package to video sharing system 130 for installation by video sharing system 130 at block 1302. The installation package can include, e.g., libraries and executable code to facilitate video sharing system 130 communicating with manager system 110 in furtherance of services provided by manager system 110. The installation package installed at block 1302 can, e.g., permit manager system 110 to examine video files stored within publications database 3101.

At block 1201, UE device 120A can be sending registration data to manager system 110. In response to receipt of the registration data sent at block 1201, manager system 110 at block 1103 can send to data repository 108 the registration data for receipt in storage by data repository 108 at block 1082.

Figure 3:
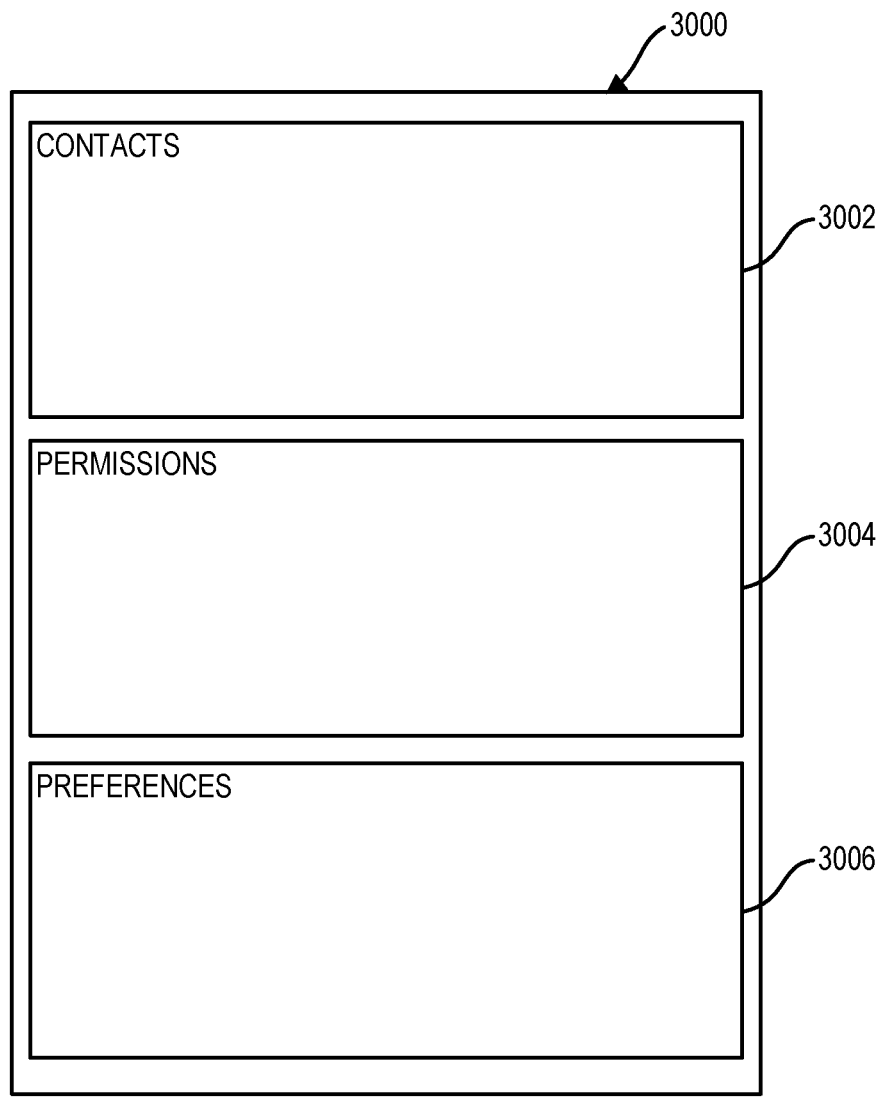
FIG. 3 depicts a user interface for display on a UE device according to one embodiment.

Registration data can be defined by a user using user interface 3000 as shown in FIG. 3. User interface 3000 can be a displayed user interface displayed on display of a UE device 120A-120Z. In contacts area 3002, the user can enter contact's information such as name, address, phone number, email address, social media address, and so forth. In permissions area 3004 a user can define permissions to facilitate use of personal data of a user by system 1000. Permissions data defined in permissions area 3004 can include, e.g., permissions to access user data stored on a client computer device of a user and permissions to access and use social media data of a user stored on a social media system such as social media system 150. A user in preferences area 3006 can specify preferences of a user, e.g., likes and dislikes, the products and services that are more important to a user, and what products and services are less important to a user. Preferences area 3006 can present survey data to a user which is responded to by a user for extraction of preferences by the user.

In response to the receipt of registration data sent at block 1201, manager system 110 at send block 1104 can send an installation package for receipt by UE device 120A. In response to receipt of the installation package, UE device 120A can install the installation package at block 1202. The installation package received and installed at block 1202 can include, e.g., libraries and executable code to facilitate operation of UE device 120A in furtherance of services provided by manager system 110 and video sharing system 130. The installation package installed at block 1202 can include a browser plugin. The installation package received and installed at block 1202 can include, e.g., libraries and executable code to facilitate the functioning of UE device 120A in system 1000. The installation package can include, e.g., software code to define browser plugin 2201 as described in FIG. 1. Browser plugin 2201 can facilitate the reporting of UE devices 120A-120Z of browsing data, in which browsing data can include webpage data associated to a page load by video sharing system 130 that is rendered on a UE device by a browser of the UE device.

At block 1105, manager system 110 can send data call data to UE device 120A and UE device 120A at block 1203 can responsively send return data. The return data can include, e.g., sensor output data and application usage data from UE device 120A. Sensor output data and application usage data can be subject to topic extraction and scores can be applied to the various extracted topics, specifying a user's preference with respect to the topic (e.g., on a scale of 0.0 to 1.0).

At block 1106, manager system 110 can send data call data to social media system 140 and social media system 140 can responsively send return data to manager system 110 at block 1401. In response to the receipt of the return data sent at block 1401, manager system 110 can proceed to block 1107.

At block 1107, manager system 110 can send the received return data sent at block 1203 and block 1401 to data repository 108 for receipt and storage by data repository 108 into users area 2101 of data repository 108 at block 1083. On completion of block 1107, manager system 110 can proceed to block 1108.

At block 1108, manager system 110 can update preferences data of the user. The updating at block 1108 can include manager system 110 updating a preferences list for the user. The performance of block 1108 can include multiple data queries of data repository 108 as indicated by receive and respond block 1084. The updated preferences list updated for a user at block 1108 can include a list of topics and preference scores associated to respective topics. The scores can be provided on a scale of 0.0, most negative preference, to 1.0, most positive preference, with 0.5 being a score for neutral preference. For assigning a preference based on a sensor output, manager system 110 can analyze a sensor output over time and can identify an activity associated to the pattern. For example, a motion pattern detected with use of an accelerometer sensor can reveal a pattern indicative of walking, or alternatively, sitting. Manager system 110 can associate a positive preference score to an activity which can be extracted to a topic based on the user participating in the activity with assigned scoring being increased for increased instances of the activity. Manager system 110 can assign preferences based on application usage in the following way: Manager system 110 for extracting preferences data based on application usage can use decision data structure as shown in Table A.

TABLE A

| Row | Application | Topic | Topic score |
|---|---|---|---|
| 1 | Running | Running | 1.0 |
| 2 | Running | Sports | 0.7 |
| 3 | Running | Fitness | 0.8 |
| ... | ... | ... | ... |
| 101 | Stock Trading | Stock Trading | 1.0 |
| 102 | Stock Trading | Investment | 0.9 |
| 103 | Stock Trading | Banking | 0.7 |
| ... | ... | ... | ... |

Referring to Table A, every application running on UE device 120A can be assigned a plurality of topics as well as a strength score associated to each respective assigned topic. The preference of a user associated to the topic can be increased in dependence on the strength score of the topic for the application and the level of usage of the application which can be determined, e.g., in terms of the number of starts of the application and/or the duration of active use of the application.

In some instances, an application can have associated search engine functionality. Examples of applications having search engine functionality can include browsers, social media applications, and online item acquisition applications. For applications having search engine functionality, manager system 110 can provide preferences data for such user by running of NLP process to extract topics from text based search engine queries of the user. Manager system 110 can determine that an extracted topic extracted from a search engine query of a user is a positive preference of a user.

Manager system 110 for discerning preferences based on social media data can subject posts data of a user to natural language processing by running of NLP process 115. Manager system 110 can subject text defining posts of a user to topic extraction, natural language processing, and sentiment extraction. Manager system 110 can increase a preference score for a user associated to a topic based on the identification of positive sentiment posts with respect to the topic and can decrement user preference with respect to a topic from a baseline value on the identification of negative sentiment posts of the user in relation to the extracted topic.

For updating a preferences list at block 1108, manager system 110 can weigh more recent data more heavily than aged data. Manager system 110, for updating of preferences list at block 1108, can include manager system 110 examining browsing data of a user with respect to a video file webpage.

At block 1204, UE device 120A can be sending to video sharing system 130 user defined browsing data defined by a user with use of a user interface of UE device 120A. With reference to depicted rendered webpage 4000 of FIG. 4, a user may have navigated to the site ABCD Vid and they specify within search area 4002 the term "budget friendly decorator." In response, a number of candidate video files can be presented in thumbnail format and the user can select one of the video files for the purposes of the user's goals. In the described example of FIG. 4, the user has selected a video file "Interior Design How To Decorate An Apartment." In the described example of FIG. 4, the selected video file can be presented and played back to the user in the primary viewing area 4004 responsively to the selection of the video file by the user. The displayed webpage can also include content augmentation area 4012 in which notification data can be displayed. While the selected video file is being played back to a user, there can be presented to a user by rendered webpage 4000 comment section 4008. Comment section 4008 can include a plurality of comment entries authored by the plurality of different respective users of system 1000.

In response to the browsing data sent at block 1204, video sharing system 130 can perform a page load and at block 1303 can send webpage data resulting from the page load for receipt and rendering by UE device 120A at block 1303. Video sharing system 130 can send webpage data at block 1303 to UE device 120A which can render the received webpage data at block 1205. At block 1206, UE device 120A can, by the operation of browser plugin 2201, send webpage data (which webpage data is rendered by UE device 120A) resulting from a page load to manager system 110.

By the action of the browser plugin 2201 at block 1206 sending webpage data, manager system 110 can proceed to examine and action decision block 1109. Manager system 110, at examine and action decision block 1109, can perform examination of the received webpage data, and based on the examination of the received webpage data can (a) run content selection process 112 to determine content to send to a user and can (b) run content scheduling process 113 to identify an optimal schedule for the presentment of content to a user.

For examination of webpage data associated to a page load at examine and action decision block 1109, manager system 110 can identify timestamp hyperlinks within comment data of the webpage data. The video file represented by primary viewing area 4004 in the described example of FIG. 4 can have 505 associated comment entries. A page load producing the webpage data sent at blocks 1303 and 1206 can have approximately 25-50 user associated comment entries, and the illustrative page load of section 4008 has eight comment entries for illustrative purposes.

Figure 4:
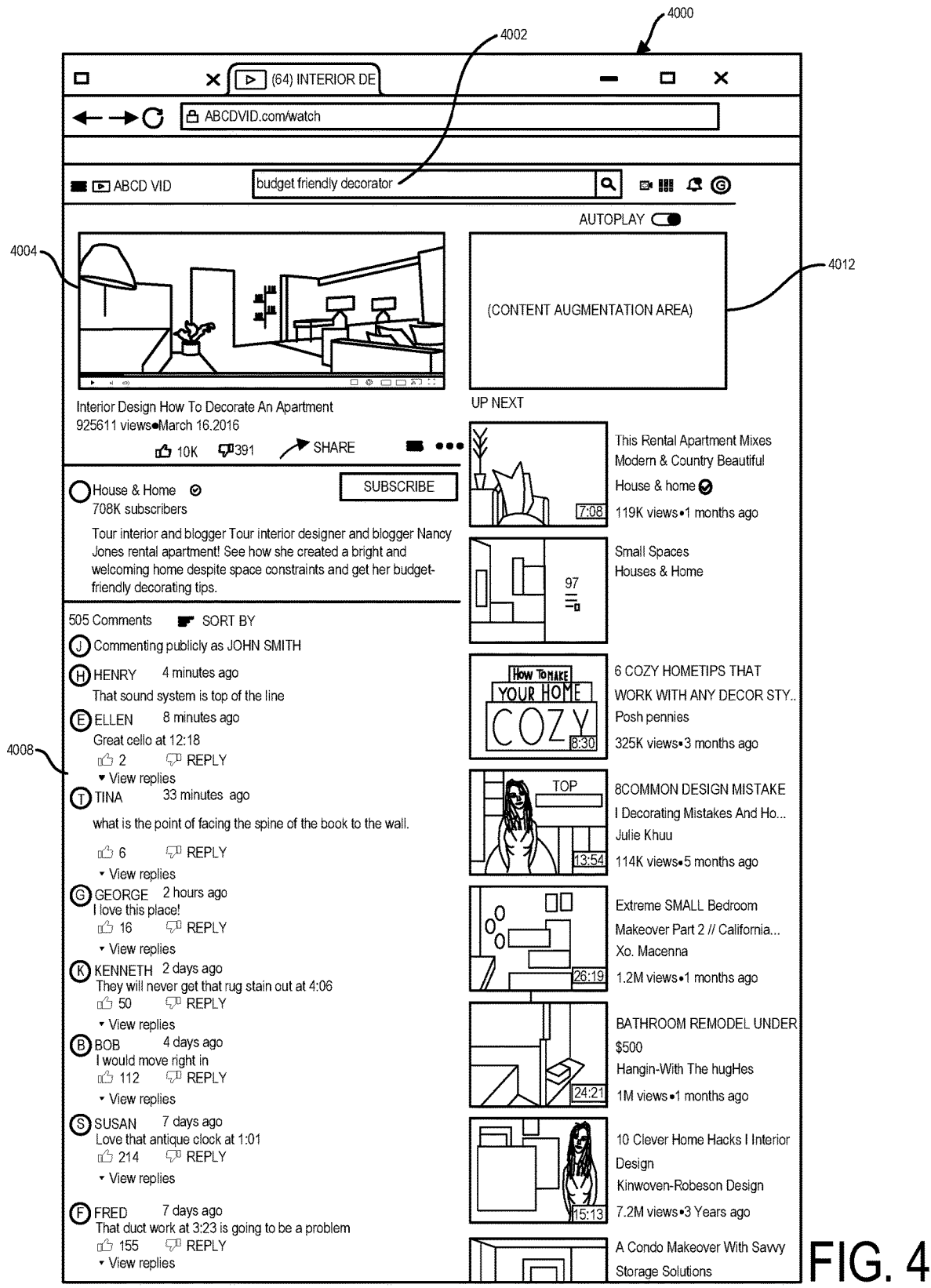
FIG. 4 is a rendered webpage for presentment of a selected video file and comment entries according to one embodiment.

For identifying comment entries having timestamp hyperlinks at block 5002, manager system 110 can examine text based markup language data associated to the representation of a rendered webpage of FIG. 4 to identify text based markup language timestamp hyperlinks therein. Table B herein below depicts representative HTML file data associated to a rendered webpage resulting from a page load by video sharing system 130 having comment entries.

TABLE B

```
=""></div>
    </div>
    <div id="header-author" class="style-scope ytd-comment-renderer">
    <a id="author-text" class="yt-simple-endpoint style-scope ytd-comment-renderer"
href="/channel/UC5faaIWHFYndJjUH8Fn75Dg">
        <span class="style-scope ytd-comment-renderer">
        Adam Maxwell
        </span>
        </a>
        <span id="author-comment-badge" class="style-scope ytd-comment-renderer"
hidden=""></span>
        <span id="sponsor-comment-badge" class="style-scope ytd-comment-renderer"
hidden=""></span>
        <yt-formatted-string class="published-time-text above-comment style-scope ytd-comment-
renderer" has-link-only_=""><a class="yt-simple-endpoint style-scope yt-formatted-string"
spellcheck="false" href="/watch?v=x_eQ1sieEyE&lc=UgwxB4ycpcu2bTLEnRF4AaABAg"
dir="auto">18 hours ago</a></yt-formatted-string>
        <span id="author-reputation" class="style-scope ytd-comment-renderer"></span>
        <span id="sponsors-only-badge" class="style-scope ytd-comment-renderer"
hidden=""></span>
        <span id="moderation-reason-divider" class="style-scope ytd-comment-renderer" hidden="">
        ·
        </span>
        <span id="moderation-reason-text" class="style-scope ytd-comment-renderer" hidden="">
        </span>
        </div>
        </div>
        <ytd-expander id="expander" max-number-of-lines="4" class="expander-exp style-scope ytd-
comment-renderer" should-use-number-of-lines="" style="--ytd-expander-max-lines:4;"><!--css-
build:shady-->
    <div id="content" class="style-scope ytd-expander">
    <yt-formatted-string id="voted-option" slot="content" class="style-scope ytd-comment-renderer"
disable-upgrade="" hidden="">
        </yt-formatted-string><yt-formatted-string id="content-text" slot="content" split-lines=""
class="style-scope ytd-comment-renderer"><span dir="auto" class="style-scope yt-formatted-
string">Cookware report</span><span dir="auto" class="style-scope yt-formatted-string">
</span><span dir="auto" class="style-scope yt-formatted-string">
</span><span dir="auto" class="style-scope yt-formatted-string">Frying pan was seen here </span><a
```

TABLE B-continued

```
class="yt-simple-endpoint style-scope yt-formatted-string" spellcheck="false"
href="/watch?v=x_eQ1sieEyE&t=98s" dir="auto">1:38</a><span dir="auto" class="style-scope
yt-formatted-string">
</span><span dir="auto" class="style-scope yt-formatted-string">
</span><span dir="auto" class="style-scope yt-formatted-string">This has been your cookware report.
Thank you.</span></yt-formatted-string>
    </div>
    <paper-button id="less" aria-expanded="true" noink="" class="style-scope ytd-expander"
role="button" tabindex="0" animated="" elevation="0" aria-disabled="false"><!--css-build:shady-->
      <span slot="less-button" class="less-button-exp style-scope ytd-comment-renderer">Show
less</span>
    </paper-button>
    <paper-button id="more" aria-expanded="false" noink="" class="style-scope ytd-expander"
role="button" tabindex="0" animated="" elevation="0" aria-disabled="false" hidden=""><!--css-
build:shady-->
      <span slot="more-button" class="more-button-exp style-scope ytd-comment-renderer">Read
more</span>
    <paper-ripple class="style-scope paper-button"><!--css-build:shady-->
        <div id="background" class="style-scope paper-ripple"></div>
          <div id="waves" class="style-scope paper-ripple"></div>
      </paper-ripple></paper-button>
      </ytd-expander>
          <yt-formatted-string class="published-time-text below-comment style-scope ytd-
          comment-renderer" has-link-only_="" hidden=""><a class="yt-simple-endpoint style-scope yt-
          formatted-string" spellcheck="false"
          href="/watch?v=x_eQ1sieEyE&lc=UgwxB4ycpcu2bTLEnRF4AaABAg" dir="auto">18
          hours ago</a></yt-formatted-string>
            <ytd-comment-action-buttons-renderer id="action-buttons" class="style-scope ytd-
          comment-renderer" action-buttons-style="desktop-toolbar"><!--css-build:shady-->
          <div id="toolbar" class="style-scope ytd-comment-action-buttons-renderer">
            <div id="reply-button" class="style-scope ytd-comment-action-buttons-renderer">
            </div>
            <span id="vote-count-left" class="style-scope ytd-comment-action-buttons-renderer" aria-
          label="356 likes" hidden="">
              356
            </span>
            <ytd-toggle-button-renderer id="like-button" class="style-scope ytd-comment-action-
          buttons-renderer style-text size-default" use-keyboard-focused="" button-renderer="true" is-
          icon-button="" has-no-text=""><a class="yt-simple-endpoint style-scope ytd-toggle-button-
          renderer" tabindex="-1"><yt-icon-button id="button" class="style-scope ytd-toggle-button-
          renderer style-text size-default"><!--css-build:shady--><button id="button" class="style-scope
          yt-icon-button" aria-label="Like this comment along with 356 other people" aria-
          pressed="false"><yt-icon class="style-scope ytd-toggle-button-renderer"><svg viewBox="0 0
          24 24" preserveAspectRatio="xMidYMid meet" focusable="false" style="pointer-events:
          none; display: block; width: 100%; height: 100%;" class="style-scope yt-icon"><g
          class="style-scope yt-icon">
            <path d="M1 21h4V9H1v12zm22-11c0-1.1-.9-2-2-2h-6.31l.95-4.57.03-.32c0-.41-.17-
.79-.44-1.06L14.17 1 7.59 7.59C7.22 7.95 7 8.45 7 9v10c0 1.1.9 2 2 2h9c.83 0 1.54-.5 1.84-
1.22l3.02-7.05c.09-.23.14-.47.14-.73v-1.91l-.01-.01L23 10z" class="style-scope yt-
icon"></path>
        </g></svg><!--css-build:shady-->
```

Manager system 110 with reference to the representative text based markup language HTML data of Table B can identify the comment entry by "Adam Maxwell" as having a timestamp hyperlink based on the identification of the following text string which includes predetermined characteristics configuring the text string as a timestamp hyperlink: href="/watch?v=x_eQ1sieEyE&t=98s"dir="auto">1:38</a>. With the identifying of a timestamp hyperlink, manager system 110 can subject text based content of the comment entry to natural language processing for extraction of NLP output parameters. Text based content of the comment entry of Adam Maxwell can include the text based content: "Cookware report . . . frying pan was seen here . . . this has been your cookware report. Thank you".

Referring to the illustrative webpage data of FIG. 4, webpage data defining a webpage can include comment section 4008 defined by a plurality of comment entries authored and posted by a plurality of different users. A subset of these comment entries includes timestamp hyperlinks. For example, the depicted comment entry by user E, "Ellen," states "Great cello at 12:18." The comment entry by user K, "Kenneth," states "They will never get that rug stain out at 4:06." The comment entry by user S, "Susan," states "Love that antique clock at 1:01." The comment entry by user F, "Fred," states "That duct work at 3:23 is going to be a problem." Described timestamp hyperlinks herein can be configured so that when a user clicks on the timestamp hyperlink, the selected video file selected by a user is played and automatically started at the playback time of the indicated timestamp.

At the time of examine and action decision block 1109, manager system 110, according to one embodiment, can have no knowledge of what timestamp hyperlink a user might activate or even whether the user will in fact activate any one of the timestamp hyperlinks of comment section 4008. It is possible that the user will simply let the selected video file play from the beginning or manually navigate to a user selected time of the selected video file using navigation buttons associated to primary viewing area 4004. Notwithstanding, at examine and action decision block 1109, manager system 110 can process certain video segment data of the selected video file represented by primary viewing area 4004 to various processing. The certain video segment data can include timestamp hyperlink video segments of the selected video file. Timestamp hyperlink video segments herein can refer to video segments associated to respective timestamp hyperlinks referenced within a webpage rendered by a UE device.

Figure 5:
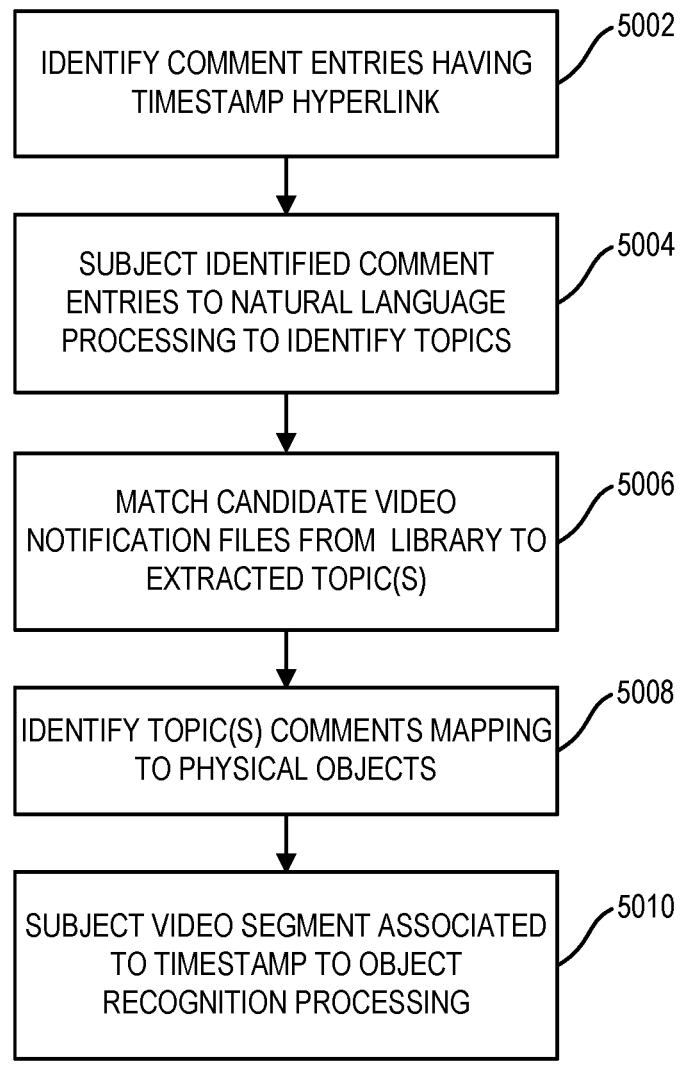
FIG. 5 is a flowchart depicting performance of a process for performance of a manager system according to one embodiment.

For determining processing of the selected video file, manager system 110 can, at examine and action decision block 1109, according to one embodiment, perform the process set forth in reference to the flowchart of FIG. 5. FIG. 5 describes a method for pre-processing a selected video file in response to selection of a published video selected for playback by a user prior to any activation of a timestamp hyperlink by the user. According to one embodiment, functional blocks appearing relatively lower in the flowchart of FIG. 2 are performed subsequent to functional blocks appearing relatively higher in the flowchart of FIG. 2. According to one embodiment, functional blocks appearing relatively lower in the flowchart of FIG. 5 are performed subsequent to functional blocks appearing relatively higher in the flowchart of FIG. 5. Accordingly, processing at examine and action decision block 1109 (FIG. 2 and FIG. 5) can be performed prior to user activation of a timestamp hyperlink at block 1207. The performance of examine and action decision block 1109 prior to block 1207 can avoid user perceivable delay associated to natural language processing and image recognition processing.

At block 5002 of the flowchart of FIG. 5, manager system 110 can examine comment entries within the webpage data sent at block 1206 for identification of timestamp hyperlinks. At block 5002, manager system 110 can examine text based markup language file data as depicted in Table A for identification of comment entries having timestamp hyperlinks, i.e., in the embodiment shown, the comment entries associated to users E, K, S, and F of FIG. 4 which include timestamp hyperlinks. For identification of timestamp hyperlinks, manager system 110 can search for text strings including timestamp hyperlinks as described in connection with Table A. At block 5002, manager system 110 can identify comment entries having timestamp hyperlinks. Thus, with reference to the text based markup language data of Table A, manager system 110 can examine text based comment entries on a comment entry-by-entry basis and can flag each respective comment entry having an associated timestamp hyperlink.

A timestamp hyperlink of a comment entry can be configured so that when a user clicks on the timestamp hyperlink, the selected video file selected for playback by a user can jump to a certain playback time of the video file specified by the timestamp hyperlink.

Referring to the depicted rendered webpage as shown in FIG. 4, a certain subset of comment entries associated to respective users can have timestamp hyperlinks. In the described embodiment of FIG. 4, the comment entries associated to user E, user K, user S, and user F have associated timestamp hyperlinks, and the remaining comment entries of the depicted page load associated to a rendered webpage, i.e., the comment entries associated to user J, user H, user T, user G, and user B, are absent of timestamp hyperlinks.

Referring again to the flowchart of FIG. 5, manager system 110 at block 5004 can subject text based comment entries identified as having timestamp hyperlinks to text based natural language processing in order to identify topics specified within the text based comment data. Thus, at block 5004, manager system 110 can subject the comment entries associated to user E, user K, user S, and user F, as described in connection with FIG. 4, to identify within those respective text entries topics thereof using natural language processing.

Results for the depicted webpage as shown in FIG. 4 are summarized in FIG. 6. Referring to FIG. 6, manager system 110 can extract from comment entry "E" the topics "music", "cello", and "instrument". Manager system 110 can extract from comment entry "K" the topics "carpet", "carpet cleaner", "cleaning," and "stain". Manager system 110 can extract from comment entry "S" the topics "antiques" and "clock". Manager system 110 can extract from comment entry "F" the topics "heating", "building," and "duct". Further description of the process of FIG. 5 is provided in connection with the schematic diagram of FIG. 6.

At block 5006, manager system 110 can match candidate video notification files from notification library 2103 defining a library to extracted topics(s) extracted that are extracted from comment entries at block 5004.

At block 5006, manager system 110 can match candidate video notification files from notification library 2103 defining a library to extracted topics extracted by processing the comment entries associated to users E, K, S, and F. For example, as set forth herein below in decision data structure of Table C, manager system 110 can examine a set of candidate video notification files, each having respective tagged topic sets.

TABLE C

| Row | Candidate video notification file | Topics | Enterprise (Owner) |
|-----|-----------------------------------|--------|---------------------|
| 1 | A001 | XX, XX, XX, XX, XX, XX, XX | XX |
| 2 | A002 | XX, XX, XX, XX | XX |
| 3 | A003 | XX, XX, XX, XX, XX, XX | XX |
| 4 | A004 | XX, XX, XX, XX, XX, XX, XX, XX, XX | XX |
| ... | ... | ... | ... |

Manager system 110 can select a candidate video notification file having the highest scoring similarity to the extracted topics extracted by processing the comment entries associated to comment entries having timestamp hyperlinks, i.e., the comment entries associated to users E, K, S, and F. Manager system 110 can score a similarity between a candidate video notification file and a comment entry based on the number of matching topics. In one aspect, the different candidate video notification files can be associated to and accessed from different enterprises. In another embodiment, all of the candidate video notification files of Table B can be obtained from a common enterprise. Manager system 110, according to one embodiment at block 5006, can provide an ordered list of highest ranking candidate video notification files ranked in terms of order of degree of similarity with the extracted topics extracted from text based comment entries.

According to one embodiment, manager system 110 can assign preference scores to extracted topics extracted from comment entries as summarized in FIG. 6. Manager system 110 can assign preference scores on a scale of 0.0 (lowest negative preference) to 1.0 (highest positive preference). For assigning preference scores, the subjecting of text based comment entries to natural language processing can include subjecting to natural language processing for output of a sentiment parameter value (e.g., in terms of negative or positive sentiment). Manager system 110 can bias a preference score for a topic downward from a baseline value in proportion to a detected negative sentiment within a comment entry, and can bias a preference score for a topic upward from a baseline value in proportion to a detected positive sentiment within a comment entry. In another aspect, manager system 110 can bias a preference score for an extracted topic extracted from a text based comment entry upward from a baseline value in the case that an author user of the comment entry has achieved the status of "influencer." Manager system 110 can determine that a user author of a comment entry has achieved the status of "influencer" where there are more than a threshold number of aggregated likes and replies to the comment entry.

Manager system 110 can use the assigned preference scores assigned to extracted topics in the performance of matching extracted topics to a candidate video notification file explained with reference to Table C. For example, manager system 110 can decrease or increase a baseline similarity score assigned to a candidate video notification by reason of it matching an extracted topic extracted from a text based comment entry in proportion to the preference level assigned to the extracted topic. Manager system 110 can use the assigned preference scores assigned to comment entry extracted topics in the determination of a level of correspondence between an extracted topic and historical positive preferences of the user. For example, manager system 110 can decrease or increase a baseline level of correspondence score in proportion to the preference level assigned to the extracted topic.

At block 5006, manager system 110 can provide a report having the structure as set forth in Table D.

TABLE D

| Comment entry having timestamp hyperlink (specified by associated user) | Matching candidate video notification file | Video notification playback schedule |
| --- | --- | --- |
| E | A016 | At onset of video segment associated to timestamp hyperlink (at the playback time of the timestamp hyperlink) |
| K | A002 | Synchronized to matching object delayed from the onset of video segment associated to timestamp |
| S | A009 | At onset of video segment associated to timestamp hyperlink (at the playback time of the timestamp hyperlink) |
| F | A004 | Synchronized to matching object delayed from the onset of video segment associated to timestamp |
| ... | ... | |

Manager system 110 at block 5006 can provide the report as shown in Table D, where there is associated to respective comment entries having timestamp hyperlinks a selected matching video notification file selected from notification library 2103 of data repository 108. In another embodiment, the Table D report can have associated to each timestamp hyperlink comment entry an ordered ranking of candidate video files ranked in order of their topic similarity to extracted topics of the timestamp hyperlink comment entry. In the described example, the selected video notification file A016 associated to comment entry "E" can have topics(s) related to "music", "cello", and/or "instrument". The selected video notification file A002 associated to comment entry "K" can have topics(s) related to "carpet", "carpet cleaner", "carpet cleaner", and/or "stain". The selected video notification file A009 associated to comment entry "S' can have topics(s) related to "antiques" and/or "clock". The selected video notification file A004 associated to comment entry "F" can have topics(s) related to "heating", "building", and/or "duct". System 1000 can be configured so that if a user clicks on the timestamp hyperlink associated to one of the comment entries, system 1000 plays back the selected video notification file determined by manager system 110 to be matched to the comment entry having the clicked on timestamp hyperlink.

At block 5008, manager system 110 can identify topics of comment entries mapping to physical objects, and at block 5010, manager system 110 can subject video segments to object recognition processing in dependence on the identifying. Embodiments herein recognize that various elements of the flowchart of FIG. 5 consume substantial processing time, such as by application of natural language processing and object recognition which can include subjecting a plurality of frames of image data defining a video segment to object recognition for extraction of identified object representations. Embodiments herein further recognize that webpage data resulting from a video sharing system page load presents a relevant subset of data for processing and thus can avoid unnecessary processing of a larger dataset. For example, a certain video file, such as the video file represented in primary viewing area 4004, can include over 500 user comments.

A single page load, however, such as the page load resulting in the webpage data sent at block 1206, can include a subset of the full set of comments, namely approximately 25 comments. While a total number of comments associated to a published video file can be extensive, embodiments herein recognize that a user will be restricted from accessing additional comment entries on a next page without a subsequent page load. Timestamp hyperlink activation options by a user (e.g., by clicking on) are restricted to those displayed in a currently rendered webpage resulting from a current page load. For improved operation of a computer system in the particular environment of a video file server, embodiments herein process the limited data of a rendered webpage resulting from a page load in anticipation of a user taking a next action involving one or more comment entries associated to the page load. By limiting the scope of processable data to data associated to a page load, embodiments herein provide a practical application wherein a subset of dataset is intelligently selected for processing in dependence on the set of next options available for the user.

At block 5008, manager system 110 can identify topics of comment entries that map to physical objects. At block 5008, manager system 110 can identify, for the comment entry "E" the topic "cello," can identify, for the comment entry "K" the topic "carpet" and "stain" mapping to physical objects, can identify for the comment entry "S" the topic "clock," and can identify for the comment entry "F" the topic "duct" mapping to a physical object.

At block 5010, manager system 110 can subject video segments associated to timestamps of comment entries having timestamp hyperlinks to object recognition processing for identification of the identified topic identified in block 5008 mapping to a physical object. For performing object recognition, manager system 110 can apply a machine learning process for object detection. Manager system 110 can, for example, identify features within and then use a technique, e.g., support vector machine (SVM) to perform classification. Manager system 110, for identifying a feature, can, e.g., use one or more of a Viola-Jones object detection framework, a scale-invariant feature transform (SIFT), or a histogram of oriented gradients (HOG) technique.

Referring to the webpage data of FIG. 4 and the summarized data of FIG. 6, the comment entry "E" can have the timestamp hyperlink specifying the timestamp 12:18. At block 5010, manager system 110 can subject the video segment of the selected video file associated to comment entry "E" commencing at 12:18 and terminating threshold time thereafter (predetermined or adaptively determined) to object recognition processing to identify within video image frames of the video segment a physical object matching an extracted topic mapping to the physical object. Manager system 110 extracts the topic "cello" from comment entry "E" and thus subjects a video segment associated to a timestamp hyperlink to object recognition for recognition of the physical object "cello." A video segment herein associated to a timestamp hyperlink can commence at a playback time of the timestamp hyperlink. At block 5010, manager system 110 can subject the video segment of the selected video file associated to comment entry "K" commencing at 4:06 and terminating threshold time thereafter (predetermined or adaptively determined) to object recognition processing to identify within video image frames of the video segment a physical object matching an extracted topic mapping to the physical object. Manager system 110 extracts the topic "carpet" and "stain" from comment entry "K" and thus subjects a video segment associated to a timestamp hyperlink to object recognition for recognition of the physical object "carpet" and "stain." At block 5010, manager system 110 can subject the video segment of the selected video file associated to comment entry "S" commencing at 1:01 and terminating threshold time thereafter (predetermined or adaptively determined) to object recognition processing to identify within video image frames of the video segment a physical object matching an extracted topic mapping to the physical object. Manager system 110 extracts the topic "clock" from comment entry "S" and thus subjects a video segment associated to a timestamp hyperlink to object recognition for recognition of the physical object "clock." At block 5010, manager system 110 can subject the video segment of the selected video file associated to comment entry "F" commencing at 3:23 and terminating threshold time thereafter (predetermined or adaptively determined) to object recognition processing to identify within video image frames of the video segment a physical object matching an extracted topic mapping to the physical object. Manager system 110 extracts the topic "duct" from comment entry "F" and thus subjects a video segment associated to a timestamp hyperlink to object recognition for recognition of the physical object "duct."

Referring again to FIG. 6, manager system 110 can generate various statistics, such as timing statistics, in which the manager system 110 provides, based on extracted topics and based on object recognition performed on a video segment, a time at which an object in common with an extracted topic mapping to a physical object appears in a video segment. For performance of block 5010, manager system 110 can generate timing data specifying the times at which a representation of a physical object mapping to an extracted topic extracted from a text based comment entry appears in a video segment. Manager system 110 at block 5010 can subject to processing a video segment of the video file represented in primary viewing area 4004. For example, manager system 110, for examining a video segment associated with a common entry having a timestamp hyperlink, can examine video segment data having a beginning time at the time of the timestamp of the relevant timestamp hyperlink and an ending time at a predetermined time or dynamically determined time after the beginning time. In the described example of FIG. 6, manager system 110 can determine that objects in common with various extracted topics mapping to physical objects, in some instances, appear in a video file sometime after the specified timestamp.

Embodiments herein recognize that for improved performance of a user interface associated to a video sharing service as set forth herein, manager system 110 can synchronize presentment of a video notification file to a time at which a topic extracted from comment text data mapping to a physical object appears in a timestamp hyperlink video segment of a played back video file. Providing such synchronization can improve the attention level of a user, and therefore, performance of the defined user interface.

In another aspect at block 5010, manager system 110 can determine an environmental setting for the various video file segments associated to the timestamps of the comment entries labeled E, K, S, and F as explained with reference to FIG. 6. For determining an environmental setting, manager system 110 can initially classify objects within frames of image data into foreground elements and background elements. For classification of a frame of image data into foreground and background elements, manager system 110 can separate moving objects called "foreground" from static information called "background" in video sequences. Manager system 110 can employ background modeling in performing background separation. Background modeling can include pixel level based background modeling and/or image level based background modeling. With video data separated between background and foreground, manager system 110 can perform object recognition with respect to background elements. Manager system 110 can then use a decision data structure as set forth in reference to Table E in order to classify an environmental setting of video file segment.

TABLE E

| Row | Environmental Setting | Background physical objects |
|---|---|---|
| 1 | Indoor Modern | XX, XX, XX, XX, XX, XX |
| 2 | Outdoor Summer | XX, XX, XX, XX, XX |
| 3 | Indoor Traditional | XX, XX, XX, XX, XX, XX |
| 4 | Outdoor Winter | XX, XX, XX, XX, XX, XX, XX, XX, XX |
| ... | ... | ... |

Referring to Table E, manager system 110 can classify an environmental setting of a video file segment based on recognized physical objects within a video segment. In the described example, manager system 110 can determine that the current environmental setting for each of the video segments associated to users E, K, S, and F, as described in FIG. 6, is the environmental setting "indoor modern."

In another aspect, manager system 110 at block 5006 can use an enhanced decision data structure as set forth herein below in Table F.

TABLE F

| Row | Candidate video notification file | Topics | Environmental Setting | Enterprise (Owner) |
|---|---|---|---|---|
| 901 | A901 | XX, XX, XX, XX, XX, XX, XX, XX | Indoor Modern | XX |
| 902 | A902 | XX, XX, XX | Outdoor Summer | XX |
| 903 | A903 | XX, XX, XX, XX, XX, XX, XX, XX | Indoor Modern | XX |
| 904 | A904 | XX, XX, XX, XX, XX, XX | Indoor Traditional | XX |
| ... | ... | ... | | ... |

In the enhanced decision data structure of Table F, there is an additional column relative to the decision data structure of Table C that classifies each respective candidate video notification file with an additional classifier for environmental setting. Manager system 110, according to one embodiment at block 5006, can further perform matching of a candidate video notification file by matching the environmental setting of the candidate video notification file to the identified environmental setting of the video segment associated to a comment entry having a timestamp hyperlink. Performing the matching as described with environmental setting of a selected video notification file matched to that of the timestamp hyperlink video segment improves the ability of the user to comprehend and engage with the presented video notification file, while at the same time maintaining focus on the content of the original video file presentment. In the preprocessing of video segments, as set forth herein prior to any activation of any timestamp hyperlink, the timestamp hyperlink can facilitate accurate matching of an environmental setting of video notification file with that of a selected video file for presentment as represented in primary viewing area 4004 of rendered webpage 4000. For example, items associated to a background may accumulate over a plurality of frames of image data and in such situations, object recognition with respect to a plurality of frames can enhance the matching. Manager system 110, further at examine and action decision block 1109, can determine a timing for playback of a video notification file. System 1000 can be configured so that a played back video notification file is played back simultaneously with playback of the selected video file within content augmentation area 4012 of rendered webpage 4000 as shown in FIG. 4. In addition or alternatively, a played back video notification file can be played back with a selected video file in primary viewing area 4004 preempting playback of a selected video file (successive playback of the selected video file selected by a user and selected video notification file selected by manager system 110). In some embodiments, a played back video notification file can be replaced by a played back still frame image file. There is set forth herein, according to one embodiment, identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

Manager system 110, according to one embodiment, can apply the formula of Eq. 1 for determining whether to launch playback of the notification video file at the onset of playback of a timestamp hyperlink video segment (at the playback time of the timestamp hyperlink) or alternatively delay launching of the video notification file so that playback of the selected video notification file is synchronized to a recognized object representation of a video segment matching comment text data and extracted topic mapping to a physical object appearing in a played back video segment. Manager system 110 can apply Eq. 1 as follows:

$$S=F1\,W1+F2\,W2+F3\,W3 \tag{Eq. 1}$$

Where S is a scoring value that specifies the predicted performance of a selected video notification file if playback of the selected video notification file is delayed to a time later in playback of a timestamp hyperlink video segment (i.e., subsequent to a delay after the onset of the timestamp hyperlink video segment) where F1, F2, and F3 are factors and W1, W2, and W3 are weights associated to the various factors F1, F2, and F3.

Manager system 110, according to one embodiment, can be configured to delay playback of a video notification file until a time after the onset of a timestamp hyperlink video segment on the condition that the scoring value S of Eq. 1 exceeds a threshold, e.g., a predetermined or dynamically determined threshold. Manager system 110, according to one embodiment, can be configured to delay playback of a video notification file until a time that playback of a video notification file is synchronized to the appearance of an object representation in the played back video segment that matches a comment text data extracted topic mapping to a physical object on the condition that the scoring value S of Eq. 1 exceeds a threshold, e.g., a predetermined or dynamically determined threshold. Manager system 110 can be configured so that where the scoring value S does not exceed the threshold, manager system 110 controls playback of the selected video notification file so that playback is commenced at the playback time specified in a timestamp hyperlink.

Referring to Eq. 1, F1 can be a time factor. Manager system 110 can apply a higher than baseline scoring value under factor F1 where a time of appearance in a timestamp hyperlink associated video segment of an object matching a topic mapping to a comment text data extracted topic exceeds a time threshold, and can assign lower than baseline scoring values under factor F1 where the time of appearance of the matching object in the timestamp hyperlink video segment is less than a threshold.

By default, with reference to Eq. 1, it can be beneficial to play a selected video notification file at the onset of a timestamp hyperlink video segment associated to a timestamp hyperlink (at the playback time of the timestamp hyperlink). However, embodiments herein recognize that where an object in common with an entity topic extracted from a comment entry is presented after a delay, it can be beneficial for augmenting the attention and dual focus of a user (i.e., simultaneous focus on both the video notification file and the original video file in primary viewing area 4004) to delay presentment of the video notification file until the time of presentment of a recognized object matching an extracted topic mapping to an object extracted from text based comment data. According to factor F1, it becomes more likely that manager system 110 will decide using Eq. 1 to delay presentment of a video notification file to a time subsequent to a playback time of video notification file in the case that an object in common with an extracted comment topic mapping to a physical object appears in a played back video segment after a threshold exceeding delay.

Figure 7:
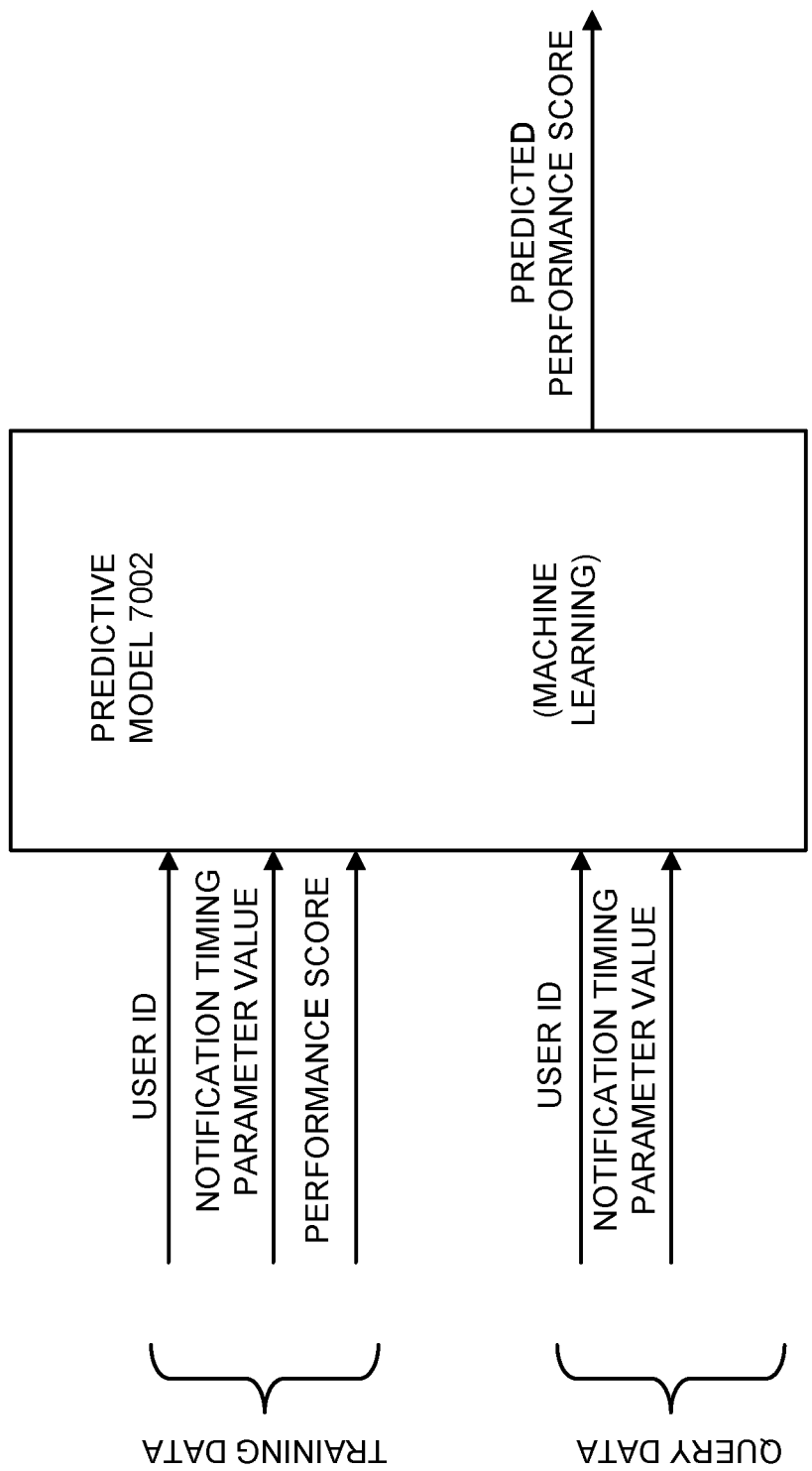
FIG. 7 depicts a predictive model trained by machine learning according to one embodiment.

Manager system 110, according to factor F2, can apply higher than baseline scoring values under factor F2 where the user has historically performed better with delayed presentment of a video notification file and can apply lower than baseline scoring values in the case that the user has historically responded better where a video notification file was played back at the onset of a timestamp hyperlink video segment. For performing scoring under factor F2, manager system 110 can query a predictive model that has been trained with training data specifying historical experiences of the user when engaging with a timestamp hyperlink in a comment entry of a video file server. For assigning scoring values under factor F2, manager system 110 can query predictive model 7002 as shown in FIG. 7 after it has been trained by machine learning. Predictive model 7002 can be trained with use of iteratively applied training dataset. Each training dataset can include a combination of (a) user ID, (b) a notification timing parameter value (i.e., onset presented or delayed), and (c) an outcome parameter provided by a performance score associated to the notification. For ascertaining (c), manager system 110 can discern whether the user performed the action specified in the notification. For example, where a video notification file specifies acquiring a certain item, manager system 110 can examine application usage data of the user from an item acquisition application running on a UE device of the user to ascertain the item has been acquired. Performance of a video notification file can be scored on a scale from 0.0 to 1.0 according to one embodiment. The score of 1.0 can be applied where the user performs the action specified in a video notification file such as acquiring an item. A score of 0.0 can be applied where the user takes no action. An intermediate score such as 0.5 can be applied where a user does not perform the action specified but takes some action (e.g. browses for an item online without acquiring). Predictive model 7002 trained as described can "learn" which notification strategy (onset presentment or delayed and synchronized to object recognition) performs better for a particular user. Predictive model 7002, once trained, can be trained with first and second sets of query data. The first set of query data can include the combination of (i) user ID and (ii) a specifier for a notification presented at the onset of timestamp hyperlink video segment. The second set of query data can include the combination of (i) user ID and (ii) a specifier for a delayed and synchronized notification. Manager system 110 can assign scoring values under factor F2 in dependence on which set of query data produces the higher predicted performance score. In response to the applied query data, predictive model 7002 can provide an output that specifies a predicted performance of the user in response to the notification. Manager system 110 can apply scoring values under factor F2 in dependence the output from predictive model 7002.

Manager system 110, according to factor F3, can ascertain a correspondence level between a topic of a comment entry having a timestamp hyperlink and historical positive preferences of a user, which as set forth herein can be iteratively updated by manager system 110 at block 1108. There can be a plurality of degrees of correspondence. In some situations, a user may click on a timestamp hyperlink that is strongly associated to historical positive preferences of a user. In other situations, the activation of a timestamp hyperlink by a user can be spurious and can represent a divergence from the user's historical pattern. Manager system 110 under factor F3 can assign higher scoring values under factor F3 (making it more likely to activate a delay) in the case that the comment entry topic is weakly matched to a historical positive preference of a user and can assign lower scoring values under factor F3 where the comment entry topic is strongly matched to a historical positive preference of a user as determined from a preferences list maintained within users area 2101 and iteratively updated at block 1108. For ascertaining a level of correspondence between an extracted topic and historical positive preferences of a user, manager system 110 can find the extracted topic in an ordered list of topics of the user ranked by preference level, and can use the preference level as the level of correspondence (higher preference level in the ordered list equating to higher level of correspondence), Embodiments herein recognize that where a comment entry topic has threshold exceeding dissimilarity relative to historical preferences of a user, the user may further benefit from synchronization of playback of a video notification file with respect to content of an original video file (in the timestamp hyperlink video segment). Embodiments herein recognize that where a comment entry topic has threshold exceeding dissimilarity relative to historical preferences of a user, the user may further benefit from synchronization of playback of a video notification file with respect to a recognized object representation in a timestamp hyperlink video segment of the selected video file that matches an extracted topic from a comment entry associated to the timestamp hyperlink, the extracted topic mapping to an object of the recognized object representation.

On completion of examine and action decision block 1109, manager system 110 can proceed to block 1110. At block 1110, manager system 110 can make a data call request on data repository 108 and notification library 2103 thereof and in response, data repository 108 can return at send block 1086 the requested video notification files from notification library 2103. At block 1086, data repository 108 can send multiple video notification files, i.e., there can be sent a respective video notification file for each contingency of a user activated by clicking on a timestamp hyperlink within a comment entry. Accordingly, with respect to the described example, video notification files can be sent for each of the timestamp hyperlink video segments associated to the comment entries for user E, user K, user S, and user F as described in reference to FIG. 6.

At block 1111, manager system 110 can send the prepared and selected video notification files to video sharing system 130, which at store block 1305, can store the video notification files in a select area of data repository 208 on the contingency that a user will next activate a timestamp hyperlink within a comment entry of a currently displayed page view as shown in FIG. 4. With the sending of the selected video notification files at block 1111, manager system 110 can send scheduling data which specified times at which the respective video notification files are to be played back on selection of an associated timestamp hyperlink. According to one embodiment, manager system 110 at block 1111 can send the report data of Table D, in which report data can include scheduling data for scheduling playback of a video notification file (e.g., at the playback time of the timestamp hyperlink or delayed and synchronized to the appearance of a video segment recognized object matching an extracted topic of a comment entry).

With further reference to the flowchart of FIG. 2 based on user defined data, UE device 120A at block 1207 can send further browsing data to video sharing system 130. For example, the user can click on a particular one timestamp hyperlink of one of the comment entries having a timestamp hyperlink for selection of the one video file of the set of video files sent at block 1111 associated to the activated and clicked on timestamp hyperlink. The browsing data sent at block 1207 can specify that the particular one timestamp hyperlink has been clicked on by the user. Responsively at block 1306, video sharing system 130 can send to UE device 120A streaming media data of the selected one video file for playback at playback block 1208 by UE device 120A. The sending of streaming media data at block 1306 can be in accordance with an action decision at examine and action decision block 1109 wherein for each respective timestamp hyperlink within a webpage associated to a page load, a particular video notification file and a particular timing schedule has been determined with use of historical data. The sending of streaming media data at block 1306 can include selectively sending streaming media data of the selected one video file selected by the sending of the browsing data sent at block 1207, which browsing data can specify that the particular one timestamp hyperlink has been clicked on by the user. The sending of streaming media data at block 1306 can be in accordance with the timing of the playback scheduling data associated the selected one video file selected by the browsing data sent at block 1207 (which playback scheduling data as summarized in Table D can have been sent at block 1111). The playback at block 1208 can be in real time without user perceivable delay given that potentially perceivable processing delay has occurred at examine and action decision block 1109 during a time in which the user can be observing a rendered webpage resulting from a video sharing system page load but before the user has clicked on a certain timestamp hyperlink of a particular comment entry. There is set forth herein, according to one embodiment, identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing.

After playback at block 1208, UE device 120A can proceed to return block 1209. At return block 1209, UE device 120A can return to a stage prior to block 1203 and can iteratively perform the loop of blocks 1203 to 1209. Similarly, manager system 110, at return block 1112, can return to a stage preceding block 1105 to iteratively perform the loop of blocks 1105 to 1112. Similarly, data repository 108, at return block 1087, can return to a stage preceding block 1081 to iteratively perform the loop of blocks 1081 to 1087. Similarly, video sharing system 130, subsequent to sending streaming media data at block 1306, can proceed to return block 1307. At return block 1307, video sharing system 130 can return to a stage preceding block 1303 and can iteratively perform the loop of block 1303 to block 1307. Similarly, subsequent to sending return data at block 1401, social media system 140 at return block 1402 can return to a stage preceding block 1401 to iteratively perform the loop of blocks 1401 and 1402. Video sharing system 130, at return block 1307 by operation of installed executable code installed at block 1305, can purge any unused video notification files from data repository 208.

Embodiments herein recognize that one way of navigating through media content is by reading or viewing comments associated to shared media content such as video files. In a video server platform that provides video sharing, the comments add significant value to many video files. Embodiments herein recognize that comments can provide timestamp references to the content presented in a video file along with some form of comment to contextualize the reference. Embodiments herein recognize that the clicks that a user undertakes surrounding these timestamp hyperlinks in the comments of multimedia can contain relevant information for a commerce transaction such as targeted content.

A system and method can process comment data associated to a published multimedia file. Comment data have included timestamp hyperlinks. Embodiments herein can derive targeted content injection opportunities based on the context of the comment data surrounding a timestamp hyperlink and/or the video segment content linked to directly.

According one embodiment, there can be provided a method wherein (a) a user opts into a services providing system; (b) the user searches for and browses video files on a video sharing system site; (c) the user notices an interesting comment associated to a selected video file having a timestamp hyperlink and clicks on it; (d) the system analyzes context of the link and derives content, intent and sentiment; (e) the system determines a relevant notification for injection; (f) the system determines a scheduling for the selected notification; and (g) the system plays back the selected notification according to the determined scheduling.

According to one example, Adam can be on a video sharing system and looking for video files. The engine knows he has an interest in teamaking based on his search results. The content engine shows him tea related content. When Bob is looking at the comments, he sees someone mention "Wow, those teacakes look great at 2:12". Adam sees this comment and wants to see what the teacakes look like, so he clicks the URL and views the content. The AI engine knows Adam is interested in teacakes based on him clicking the timestamp, so as soon as the video jumps to 2:12, it shows him a quick piece of digestible content for teacakes.

According one embodiment, there can be provided a method wherein (a) a user opts into a service providing system that tracks user profile and behavior on a media platform; (b) other users leave reviews in the comments of a media posting including timestamp hyperlinks; (c) when the user views comments, the system can process what content the user not only hovers over but clicks; (d) when a user clicks an internal link, the comment context of the link can be captured; (e) the system can process information of child and parent comments, previous poster comments, sentiment outputs, and/or topic analysis and modelling; (f) the system can process the content that the timestamp is referring to, and can use machine vision, audio processing, and other metadata to classify content for the timestamp; (g) the system can derive, e.g., core intents, reasoning, based on natural language processing (e.g., based on natural language classification (NLC), natural language understanding (NLU)), knowledgebase searching, machine vision; (h) using natural language processing the system can provide sentiment outputs, e.g. funny, action, sad (i) using natural language processing the system can provide topic outputs; (j) the system can combine outputs provided by processing of comment data and video segment data where the video segment data is video data associated to a comment timestamp; (k) a notification engine can ingest the contexts as keywords to base content such as video based notification on that when the user jumps to video file playback time associated to a timestamp by clicking on a timestamp hyperlink, the engine can inject a notification for a related topics. In some embodiments, the notification can be created on the fly using language and terms tailored to be similar to the language used in the comment clicked to maintain a similar look and feel to the published video file. Accordingly, a smoother transition and experience for the user can be produced for providing a notification having improved performance.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer implemented method including: identifying a certain timestamp hyperlink included within a text based comment entry associated to a published video file, where the published video file has been selected by a user, where the published video file is published on a video sharing system, and where the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing. Other embodiments of this aspect include corresponding computer systems, apparatus, and computer programs recorded on one or more computer storage devices, each configured to perform the actions of the methods.

Implementations may include one or more of the following features. The computer implemented method where the subjecting the text based comment entry to natural language processing includes extracting topics from the text based comment entry. The computer implemented method where the method includes subjecting to image processing a video segment of the published video file, and where the injecting a notification for playback to the user with the published video file is in dependence on the subjecting to image processing the video segment, and where the video segment is a video segment commencing at a playback time of the certain timestamp hyperlink. The computer implemented method where the method includes, in response to the user selecting the published video file, examining webpage data rendered on a user equipment device of the user resulting from a page load by the video sharing system which sends the webpage data to the user equipment device, where the examining includes identifying a plurality of timestamp hyperlinks within the webpage data, and where the plurality of timestamp hyperlinks include the certain timestamp hyperlink. The computer implemented method where the injecting a notification is performed responsively to the user clicking on the certain timestamp hyperlink. The computer implemented method where the injecting a notification is performed responsively to the user clicking on the certain timestamp hyperlink, and where the subjecting the text based comment entry having the certain timestamp hyperlink to natural language processing is performed prior to the user clicking on the certain timestamp hyperlink. The computer implemented method where the injecting a notification is performed responsively to the user clicking on the certain timestamp hyperlink, and where the subjecting the text based comment entry having the certain timestamp hyperlink to natural language processing is performed subsequent to the user selecting the published video file and prior to the user clicking on the certain timestamp hyperlink. The computer implemented method where the injecting a notification is performed responsively to the user clicking on the certain timestamp hyperlink, and where the subjecting the text based comment entry having the certain timestamp hyperlink to natural language processing is performed subsequent to the user selecting the published video file and prior to the user clicking on the certain timestamp hyperlink, where the method includes, in response to the user selecting the published video file, examining webpage data rendered on a user equipment device of the user resulting from a page load by the video sharing system which sends the webpage data to the user equipment device, where the examining includes performing the identifying the certain timestamp hyperlink, the identifying the certain timestamp hyperlink including identifying a markup language text string having predetermined characteristics within the webpage data. The computer implemented method where the subjecting the text based comment entry to natural language processing includes extracting a certain topic from the text based comment entry, where the certain topic extracted from the text based comment entry maps to a physical object, and where the method includes performing object recognition on a video segment of the published video file associated to the certain timestamp hyperlink to identify a physical object representation within the video segment matching the certain topic extracted from the text based comment entry, and where the injecting the notification for playback to the user with the published video file is performed in dependence on the matching. The computer implemented method where the subjecting the text based comment entry to natural language processing includes extracting a certain topic from the text based comment entry, where the certain topic extracted from the text based comment entry maps to a physical object, and where the method includes performing object recognition on a video segment of the published video file associated to the certain timestamp hyperlink to identify a physical object representation within the video segment matching the certain topic extracted from the text based comment entry, and where the injecting the notification for playback to the user with the published video file is performed in dependence on the matching so that playback of the notification is synchronized to an appearance of the physical object representation within the video segment. The computer implemented method where the method includes, in response to the user selecting the published video file, examining webpage data rendered on a user equipment device of the user resulting from a page load by the video sharing system which sends the webpage data to the user equipment device, where the examining includes identifying a plurality of timestamp hyperlinks within the webpage data, and where the plurality of timestamp hyperlinks include the certain timestamp hyperlink, and where the examining is performed by a computing node based system external to the video sharing system and the user equipment device of the user, where the computing node based system receives the webpage data from a browser plugin of the user equipment device, where the method includes installing the browser plugin on the user equipment device on a registration the user as a registered user of services provided by the video sharing system. The computer implemented method where the subjecting the text based comment section to natural language processing includes extracting a topic from the text based comment entry, and a sentiment parameter value associated to the topic, and where the injecting the notification for playback to the user with the published video file is performed in dependence on the topic and the sentiment parameter value. The computer implemented method where the method includes, in response to the user selecting the published video file, examining webpage data rendered on a user equipment device of the user resulting from a page load by the video sharing system which sends the webpage data to the user equipment device, where the examining includes identifying the certain timestamp hyperlink within a text based comment entry of the webpage data, where the method includes subjecting a video segment commencing at a playback time of the certain timestamp hyperlink to object recognition processing, and where the injecting the notification for playback to the user with the published video file is performed in dependence on (a) a time of the video segment at which an object representation of the video segment that matches an extracted topic of the comment entry appears in the video segment, (b) a predicted performance of the notification as determined by querying of a predictive model that has been trained by machine learning using training data provided by historical data of the user viewing video files, the training data including data ascertained by monitoring whether the user has performed activity specified in past notifications presented to the user, and (c) a level of correspondence between the extracted topic and historical positive preferences of the user. The computer implemented method where the injecting the notification for playback to the user with the published video file is performed in response to the user clicking on the certain timestamp hyperlink, where the method includes, in response to the user selecting the published video file, examining webpage data rendered on a user equipment device of the user resulting from a page load by the video sharing system which sends the webpage data to the user equipment device, where the examining includes identifying the certain timestamp hyperlink within text based comment entry data of the webpage data, and where the method includes, prior to the user clicking on the certain timestamp hyperlink, subjecting to image processing a video segment of the published video file to extract an environmental setting of the video segment, the video segment commencing at a playback time of the certain timestamp hyperlink, and where the injecting a notification for playback to the user includes selecting a video notification file for simultaneous or successive playback to the user with the published video file, and where the selecting includes matching a candidate video notification file of a notification library to the video segment based on a candidate video notification file having an environment setting in common with the environment setting extracted from the video segment. The computer implemented method where the subjecting the text based comment section to natural language processing includes extracting a topic from the text based comment entry, and a sentiment parameter value associated to the topic, where the injecting the notification for playback to the user with the published video file is performed in dependence on the topic and the sentiment parameter value, where the notification is provided by playing back a video notification file selected from a library of candidate video notification files, and where selecting of the video notification includes identifying a match between the extracted topic extracted from the text based comment entry and topics associated to respective ones of the candidate video notification files of the library. The computer implemented method where the method includes subjecting a video segment of the published video file commencing at a playback time of the certain timestamp hyperlink to object recognition to identify an object representation that matches a topic extracted from the text based comment entry by the natural language processing, where the injecting the notification for playback to the user with the published video file is performed in response to the user clicking on the certain timestamp hyperlink, and where the injecting the notification is performed in dependence on a recognizing within a video segment of the published video file commencing at a playback time of the certain timestamp hyperlink an object representation that matches a topic extracted from the text based comment entry by the natural language processing. The computer implemented method where the method includes, in response to the user selecting the published video file, examining webpage data rendered on a user equipment device of the user resulting from a page load by the video sharing system which sends the webpage data to the user equipment device, where the examining includes identifying a plurality of timestamp hyperlinks within the webpage data, and where the plurality of timestamp hyperlinks include the certain timestamp hyperlink, and where the examining is performed by a computing node based system external to the video sharing system and the user equipment device of the user, where the computing node based system receives the webpage data from a browser plugin of the user equipment device, where the method includes installing the browser plugin on the user equipment device on registration the user as a registered user of services provided by the video sharing system, where the method includes subjecting a video segment commencing at a playback time of the certain timestamp hyperlink to object recognition processing, and where the injecting the notification for playback to the user with the published video file is performed in dependence on (a) a time of the video segment at which an object representation of the video segment that matches an extracted topic of the comment entry appears in the video segment, (b) a predicted performance of the notification as determined by querying of a predictive model that has been trained by machine learning using training data provided by historical data of the user viewing video files, the training data including data ascertained by monitoring whether the user has performed activity specified in past notifications presented to the user, and (c) a level of correspondence between the extracted topic and historical positive preferences of the user. The computer implemented method where the method includes, in response to the user selecting the published video file, examining webpage data rendered on a user equipment device of the user resulting from a page load by the video sharing system which sends the webpage data to the user equipment device, where the examining includes identifying a plurality of timestamp hyperlinks within the webpage data, and where the plurality of timestamp hyperlinks include the certain timestamp hyperlink, and where the examining is performed by a computing node based system external to the video sharing system and the user equipment device of the user, where the computing node based system receives the webpage data from a browser plugin of the user equipment device, where the method includes installing the browser plugin on the user equipment device on registration the user as a registered user of services provided by the video sharing system, where the method includes subjecting a video segment commencing at a playback time of the certain timestamp hyperlink to object recognition processing, and where the injecting the notification for playback to the user with the published video file is performed in dependence on (a) a time of the video segment at which an object representation of the video segment that matches an extracted topic of the comment entry appears in the video segment, (b) a predicted performance of the notification as determined by querying of a predictive model that has been trained by machine learning using training data provided by historical data of the user viewing video files, the training data including data ascertained by monitoring whether the user has performed activity specified in past notifications presented to the user, and (c) a level of correspondence between the extracted topic and historical positive preferences of the user, where the subjecting the text based comment section to natural language processing includes extracting a topic from the text based comment entry, and a sentiment parameter value associated to the topic, where the injecting the notification for playback to the user with the published video file is performed in dependence on the topic and the sentiment parameter value, where the notification is provided by playing back a video notification file selected from a library of candidate video notification files, and where selecting of the video notification includes identifying a match between the extracted topic extracted from the text based comment entry and topics associated to respective ones of the candidate video notification files of the library, where the extracted topic extracted from the text based comment entry maps to a physical object, and where the method includes performing object recognition on a video segment of the published video file associated to the certain timestamp hyperlink to identify a physical object representation within the video segment matching the extracted topic extracted from the text based comment entry, and where the injecting the notification for playback to the user with the published video file is performed in dependence on the matching so that playback of the notification is synchronized to an appearance of the physical object representation within the video segment. Implementations of the described techniques may include hardware, a method or process, or computer software on a computer-accessible medium.

One general aspect includes a computer program product including: a computer readable storage medium readable by one or more processing circuit and storing instructions for execution by one or more processor for performing a method including: identifying a certain timestamp hyperlink included within a text based comment entry associated to a published video file, where the published video file has been selected by a user, where the published video file is published on a video sharing system, and where the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing. Other embodiments of this aspect include corresponding computer systems, apparatus, and computer programs recorded on one or more computer storage devices, each configured to perform the actions of the methods.

One general aspect includes a system including: a memory; at least one processor in communication with the memory; and program instructions executable by one or more processor via the memory to perform a method including: identifying a certain timestamp hyperlink included within a text based comment entry associated to a published video file, where the published video file has been selected by a user, where the published video file is published on a video sharing system, and where the certain timestamp hyperlink is configured so that clicking on the certain timestamp hyperlink results in playback of the published video file jumping to a playback time specified by the certain timestamp hyperlink; subjecting the text based comment entry having the certain timestamp hyperlink to natural language processing; and injecting a notification for playback to the user with the published video file in dependence on a result of the natural language processing. Other embodiments of this aspect include corresponding computer systems, apparatus, and computer programs recorded on one or more computer storage devices, each configured to perform the actions of the methods.

Figure 8:
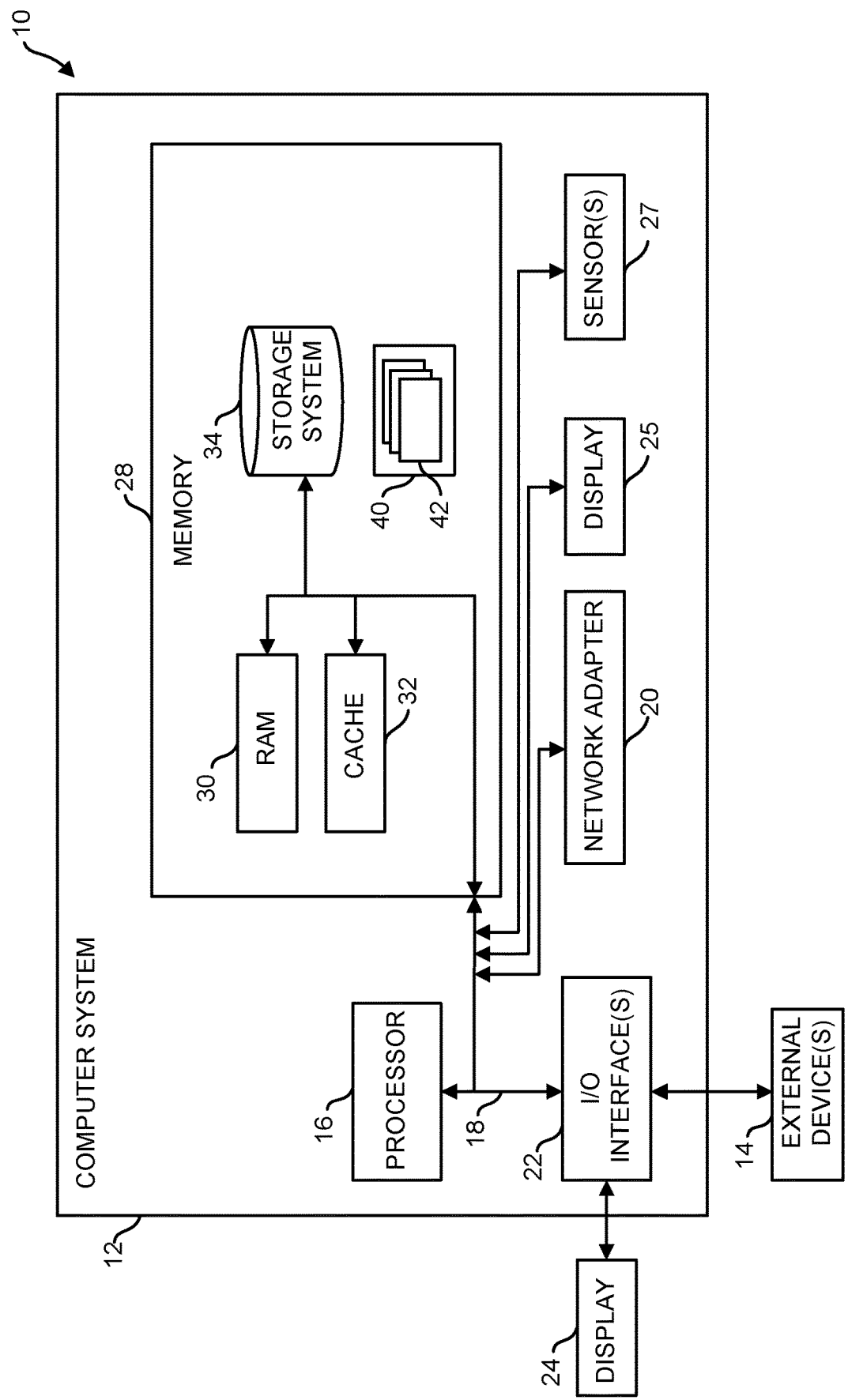
FIG. 8 depicts a computing node according to one embodiment.
Figure 9:
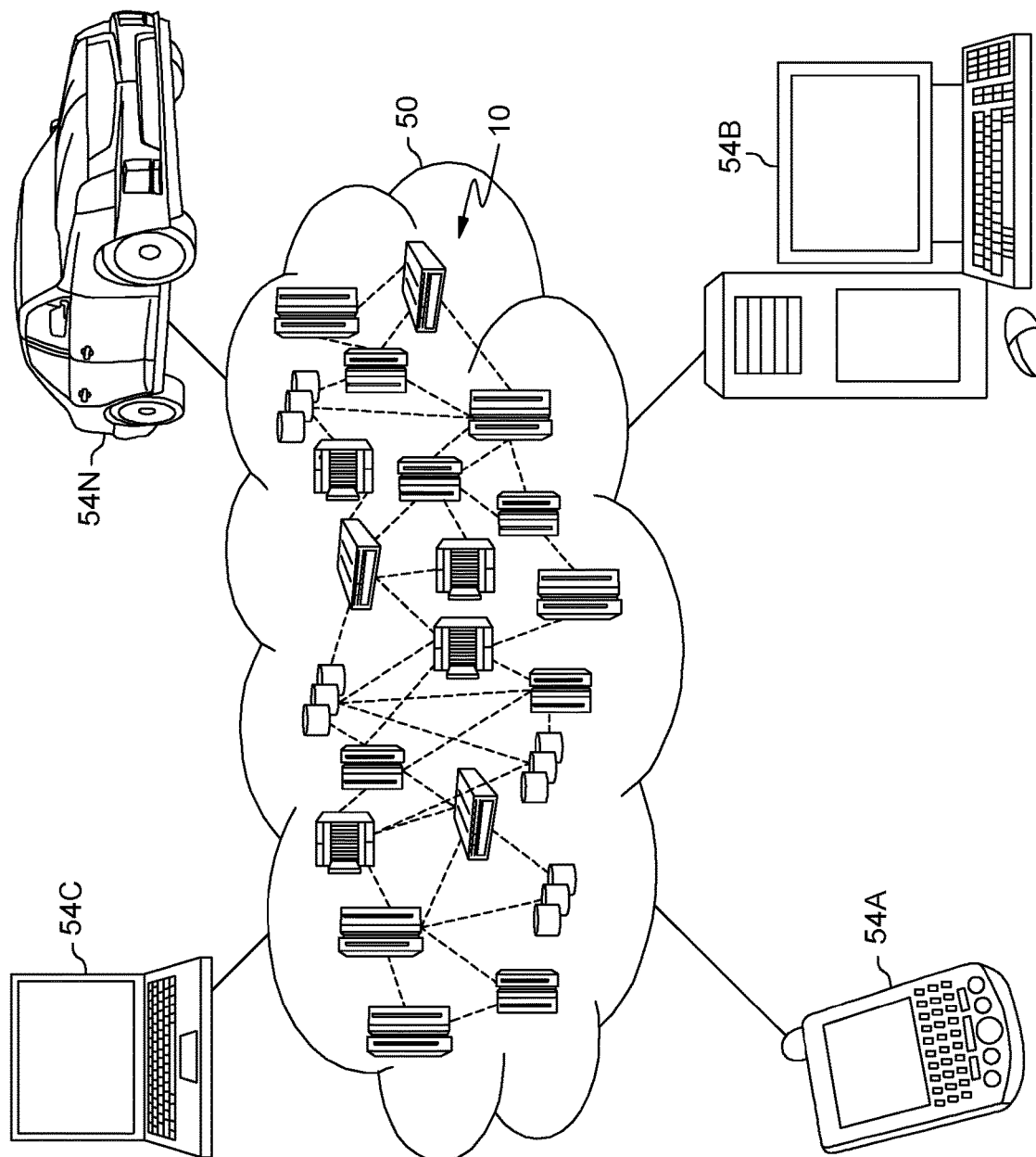
FIG. 9 depicts a cloud computing environment according to one embodiment.
Figure 10:
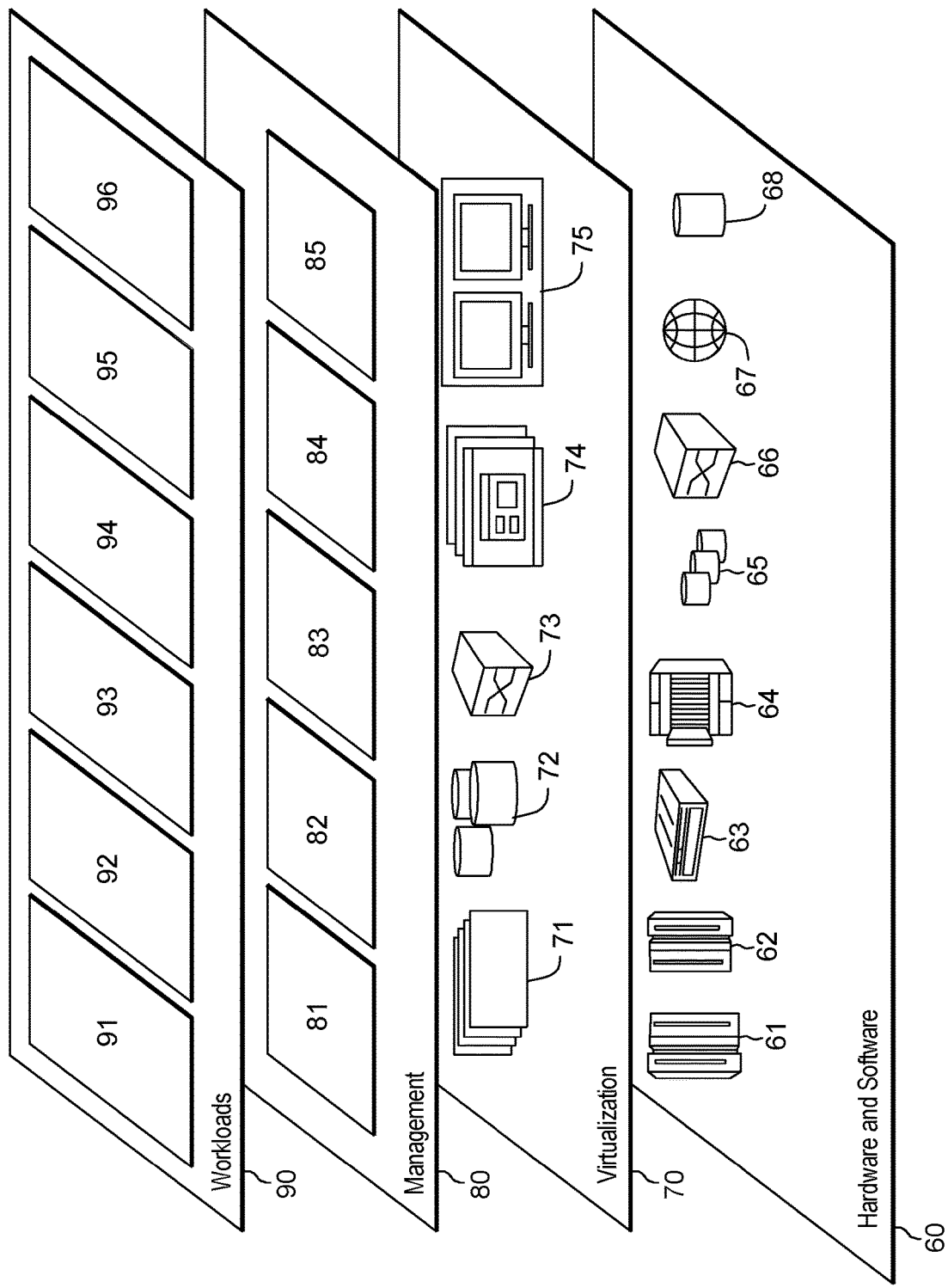
FIG. 10 depicts abstraction model layers according to one embodiment.

Certain embodiments herein may offer various technical computing advantages involving computing advantages to address problems arising in the realm of computer systems. Embodiments herein can improve the performance of a computer system particularly in the environment of video file sharing systems in which video files are presented to a user for playback. Embodiments herein can include preprocessing of data associated to a page load for avoidance of user perceivable delay. Embodiments herein can intelligently perform natural language processing and video file image processing at times when a user is reviewing data prior to user interface selection. Accordingly, a user can be presented with content in real time without user perceivable delay for enhanced engagement and performance response of the user. Embodiment herein can include identifying a timestamp hyperlink within comment data of a webpage resulting from a page load. With a timestamp hyperlink identified a text based comment entry associated to a timestamp hyperlink can be subject to natural language processing for identification of an extracted topic. The extracted topic can be matched to a notification topic within a notification library for selection of a notification, and a video segment commencing at a playback time of a timestamp hyperlink can be subject to object recognition for identification of an object representation matching the extracted topic. In a further aspect, playback to a user of the selected notification can be synchronized to the appearance of the object representation in the video segment. A fundamental aspect of operation of a computer system is its interoperation to which it operates including human actors. By increasing the accuracy, reliability and/or timing of information presented to human users, embodiments herein increase the level of engagement of human users for enhanced computer system operation. Various decision data structures can be used to drive artificial intelligence (AI) decision making, such as decision data structures that cognitively map extracted topics to asset classifiers. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can examine data from diverse data sources such as UE devices and social media platforms. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can perform functions described with reference to manager system 110 as set forth in the flowchart of FIG. 2. In one embodiment, video servicer system 130 can include one or more computing node 10 and can perform functions described with reference to video server system 130 as set forth in the flowchart of FIG. 2. In one embodiment, one or more UE device 120A-120Z can include one or more computing node 10 and can include one or more program 40 for performing functions described with reference to UE device 120A as set forth in the flowchart of FIG. 2. In one embodiment, social media system 140 can include one or more computing node 10 and can include one or more program 40 for performing functions described with reference to social media system 140 as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for enhancing performance of a user interface and video sharing system as set forth herein. The processing components 96 can be implemented with use of one or more program 40 described in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink;

subjecting the text based comment entry having the certain timestamp hyperlink to natural language processing; and injecting a notification for playback to the user with the published video file in dependence on a result of the natural language processing.

2. The computer implemented method of claim 1, wherein the subjecting the text based comment entry to natural language processing includes extracting topics from the text based comment entry.

3. The computer implemented method of claim 1, wherein the method includes subjecting to image processing a video segment of the published video file, and wherein the injecting a notification for playback to the user with the published video file is in dependence on the subjecting to image processing the video segment, and wherein the video segment is a video segment commencing at a playback time of the certain timestamp hyperlink.

4. The computer implemented method of claim 1, wherein the method includes, in response to the user selecting the published video file, examining webpage data rendered on a user equipment device of the user resulting from a page load by the video sharing system which sends the webpage data to the user equipment device, wherein the examining includes identifying a plurality of timestamp hyperlinks within the webpage data, and wherein the plurality of timestamp hyperlinks include the certain timestamp hyperlink.

5. The computer implemented method of claim 1, wherein the injecting a notification is performed responsively to the user clicking on the certain timestamp hyperlink.

6. The computer implemented method of claim 1, wherein the injecting a notification is performed responsively to the user clicking on the certain timestamp hyperlink, and wherein the subjecting the text based comment entry having the certain timestamp hyperlink to natural language processing is performed prior to the user clicking on the certain timestamp hyperlink.

7. The computer implemented method of claim 1, wherein the injecting a notification is performed responsively to the user clicking on the certain timestamp hyperlink, and wherein the subjecting the text based comment entry having the certain timestamp hyperlink to natural language processing is performed subsequent to the user selecting the published video file and prior to the user clicking on the certain timestamp hyperlink.

8. The computer implemented method of claim 1, wherein the injecting a notification is performed responsively to the user clicking on the certain timestamp hyperlink, and wherein the subjecting the text based comment entry having the certain timestamp hyperlink to natural language processing is performed subsequent to the user selecting the published video file and prior to the user clicking on the certain timestamp hyperlink, wherein the method includes, in response to the user selecting the published video file, examining webpage data rendered on a user equipment device of the user resulting from a page load by the video sharing system which sends the webpage data to the user equipment device, wherein the examining includes performing the identifying the certain timestamp hyperlink, the identifying the certain timestamp hyperlink including identifying a markup language text string having predetermined characteristics within the webpage data.

9. The computer implemented method of claim 1, wherein the subjecting the text based comment entry to natural language processing includes extracting a certain topic from the text based comment entry, wherein the certain topic extracted from the text based comment entry maps to a physical object, and wherein the method includes performing object recognition on a video segment of the published video file associated to the certain timestamp hyperlink to identify a physical object representation within the video segment matching the certain topic extracted from the text based comment entry, and wherein the injecting the notification for playback to the user with the published video file is performed in dependence on the matching.

10. The computer implemented method of claim 1, wherein the subjecting the text based comment entry to natural language processing includes extracting a certain topic from the text based comment entry, wherein the certain topic extracted from the text based comment entry maps to a physical object, and wherein the method includes performing object recognition on a video segment of the published video file associated to the certain timestamp hyperlink to identify a physical object representation within the video segment matching the certain topic extracted from the text based comment entry, and wherein the injecting the notification for playback to the user with the published video file is performed in dependence on the matching so that playback of the notification is synchronized to an appearance of the physical object representation within the video segment.

11. The computer implemented method of claim 1, wherein the method includes, in response to the user selecting the published video file, examining webpage data rendered on a user equipment device of the user resulting from a page load by the video sharing system which sends the webpage data to the user equipment device, wherein the examining includes identifying a plurality of timestamp hyperlinks within the webpage data, and wherein the plurality of timestamp hyperlinks include the certain timestamp hyperlink, and wherein the examining is performed by a computing node based system external to the video sharing system and the user equipment device of the user, wherein the computing node based system receives the webpage data from a browser plugin of the user equipment device, wherein the method includes installing the browser plugin on the user equipment device on a registration the user as a registered user of services provided by the video sharing system.

12. The computer implemented method of claim 1, wherein the subjecting the text based comment entry to natural language processing includes extracting a topic from the text based comment entry, and a sentiment parameter value associated to the topic, and wherein the injecting the notification for playback to the user with the published video file is performed in dependence on the topic and the sentiment parameter value.

13. The computer implemented method of claim 1, wherein the method includes, in response to the user selecting the published video file, examining webpage data rendered on a user equipment device of the user resulting from a page load by the video sharing system which sends the webpage data to the user equipment device, wherein the examining includes identifying the certain timestamp hyperlink within a text based comment entry of the webpage data, wherein the method includes subjecting a video segment commencing at a playback time of the certain timestamp hyperlink to object recognition processing, and wherein the injecting the notification for playback to the user with the published video file is performed in dependence on (a) a time of the video segment at which an object representation of the video segment that matches an extracted topic of the comment entry appears in the video segment, (b) a predicted performance of the notification as determined by querying of a predictive model that has been trained by machine learning using training data provided by historical data of the user viewing video files, the training data including data ascertained by monitoring whether the user has performed activity specified in past notifications presented to the user, and (c) a level of correspondence between the extracted topic and historical positive preferences of the user.

14. The computer implemented method of claim 1, wherein the injecting the notification for playback to the user with the published video file is performed in response to the user clicking on the certain timestamp hyperlink, wherein the method includes, in response to the user selecting the published video file, examining webpage data rendered on a user equipment device of the user resulting from a page load by the video sharing system which sends the webpage data to the user equipment device, wherein the examining includes identifying the certain timestamp hyperlink within text based comment entry data of the webpage data, and wherein the method includes, prior to the user clicking on the certain timestamp hyperlink, subjecting to image processing a video segment of the published video file to extract an environmental setting of the video segment, the video segment commencing at a playback time of the certain timestamp hyperlink, and wherein the injecting a notification for playback to the user includes selecting a video notification file for simultaneous or successive playback to the user with the published video file, and wherein the selecting includes matching a candidate video notification file of a notification library to the video segment based on a candidate video notification file having an environment setting in common with the environment setting extracted from the video segment.

15. The computer implemented method of claim 1, wherein the subjecting the text based comment entry to natural language processing includes extracting a topic from the text based comment entry, and a sentiment parameter value associated to the topic, wherein the injecting the notification for playback to the user with the published video file is performed in dependence on the topic and the sentiment parameter value, wherein the notification is provided by playing back a video notification file selected from a library of candidate video notification files, and wherein selecting of the video notification includes identifying a match between the extracted topic extracted from the text based comment entry and topics associated to respective ones of the candidate video notification files of the library.

16. The computer implemented method of claim 1, wherein the method includes subjecting a video segment of the published video file commencing at a playback time of the certain timestamp hyperlink to object recognition to identify an object representation that matches a topic extracted from the text based comment entry by the natural language processing, wherein the injecting the notification for playback to the user with the published video file is performed in response to the user clicking on the certain timestamp hyperlink, and wherein the injecting the notification is performed in dependence on a recognizing within a video segment of the published video file commencing at a playback time of the certain timestamp hyperlink an object representation that matches a topic extracted from the text based comment entry by the natural language processing.

17. The computer implemented method of claim 1, wherein the subjecting the text based comment entry to natural language processing includes extracting a sentiment parameter value, and wherein the injecting the notification for playback to the user with the published video file is performed in dependence on the sentiment parameter value.

18. The computer implemented method of claim 1, wherein the method includes performing object recognition on a video segment of the published video file associated to the certain timestamp hyperlink to identify a physical object representation within the video segment matching a topic extracted from the text based comment entry, and wherein the injecting the notification for playback to the user with the published video file is performed in dependence on the matching.

19. A computer program product comprising:
a computer readable storage medium readable by one or more processing circuit and storing instructions for execution by one or more processor for performing a method comprising:
identifying a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink;
subjecting the text based comment entry having the certain timestamp hyperlink to natural language processing; and
injecting a notification for playback to the user with the published video file in dependence on a result of the natural language processing.

20. A system comprising:
a memory;
at least one processor in communication with the memory; and
program instructions executable by one or more processor via the memory to perform a method comprising:
performing text based processing of text based markup language data to identify a certain timestamp hyperlink included within a text based comment entry associated to a published video file, wherein the published video file has been selected by a user, wherein the published video file is published on a video sharing system, and wherein the certain timestamp hyperlink is configured so that clicking on the certain timestamp hyperlink results in playback of the published video file jumping to a playback time specified by the certain timestamp hyperlink;
subjecting the text based comment entry having the certain timestamp hyperlink to natural language processing; and
injecting a notification for playback to the user with the published video file in dependence on a result of the natural language processing.

\* \* \* \* \*